(12) United States Patent
Cytron et al.

(10) Patent No.: US 7,945,528 B2
(45) Date of Patent: May 17, 2011

(54) METHOD AND DEVICE FOR HIGH PERFORMANCE REGULAR EXPRESSION PATTERN MATCHING

(75) Inventors: Ron K. Cytron, St. Louis, MO (US); David Edward Taylor, St. Louis, MO (US); Benjamin Curry Brodie, University City, MO (US)

(73) Assignee: Exegy Incorporated, St. Louis, MO (US)

(*) Notice: Subject to any disclaimer, the term of this patent is extended or adjusted under 35 U.S.C. 154(b) by 0 days.

(21) Appl. No.: 12/703,388

(22) Filed: Feb. 10, 2010

(65) Prior Publication Data

US 2010/0198850 A1    Aug. 5, 2010

Related U.S. Application Data

(62) Division of application No. 11/293,619, filed on Dec. 2, 2005, now Pat. No. 7,702,629.

(51) Int. Cl.
*G06F 15/00* (2006.01)
*G06F 15/18* (2006.01)

(52) U.S. Cl. ............................................... 706/62
(58) Field of Classification Search .............. 706/62
See application file for complete search history.

(56) References Cited

U.S. PATENT DOCUMENTS

| | | |
|---|---|---|
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols et al. |
| 4,298,898 A | 11/1981 | Cardot |
| 4,314,356 A | 2/1982 | Scarbrough |
| 4,385,393 A | 5/1983 | Chaure et al. |

(Continued)

FOREIGN PATENT DOCUMENTS

EP    0880088    11/1996

(Continued)

OTHER PUBLICATIONS

Syntactic Decision Rules for Recognition of Spoken Words and Phrases Using a Stochastic Automaton, Kashyap, R. L.; Pattern Analysis and Machine Intelligence, IEEE Transactions on vol. PAMI-1 , Issue: 2 Digital Object Identifier: 10.1109/TPAMI.1979. 4766901 Publication Year: 1979 , pp. 154-163.*

(Continued)

*Primary Examiner* — Michael Holmes
(74) *Attorney, Agent, or Firm* — Thompson Coburn LLP

(57) ABSTRACT

Disclosed herein is an improved architecture for regular expression pattern matching. Improvements to pattern matching deterministic finite automatons (DFAs) that are described by the inventors include a pipelining strategy that pushes state-dependent feedback to a final pipeline stage to thereby enhance parallelism and throughput, augmented state transitions that track whether a transition is indicative of a pattern match occurring thereby reducing the number of necessary states for the DFA, augmented state transition that track whether a transition is indicative of a restart to the matching process, compression of the DFA's transition table, alphabet encoding for input symbols to equivalence class identifiers, the use of an indirection table to allow for optimized transition table memory, and enhanced scalability to facilitate the ability of the improved DFA to process multiple input symbols per cycle.

16 Claims, 11 Drawing Sheets

U.S. PATENT DOCUMENTS

| | | | |
|---|---|---|---|
| 4,464,718 A | 8/1984 | Dixon et al. |
| 4,550,436 A | 10/1985 | Freeman et al. |
| 4,823,306 A | 4/1989 | Barbic et al. |
| 4,941,178 A | 7/1990 | Chuang |
| 5,023,910 A | 6/1991 | Thomson |
| 5,050,075 A | 9/1991 | Herman et al. |
| 5,101,424 A | 3/1992 | Clayton et al. |
| 5,140,692 A | 8/1992 | Morita |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,265,065 A | 11/1993 | Turtle |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,371,794 A | 12/1994 | Diffie et al. |
| 5,388,259 A | 2/1995 | Fleischman et al. |
| 5,396,253 A | 3/1995 | Chia |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,488 A | 3/1996 | Akizawa et al. |
| 5,544,352 A | 8/1996 | Egger |
| 5,546,578 A | 8/1996 | Takada et al. |
| 5,651,125 A | 7/1997 | Witt et al. |
| 5,701,464 A | 12/1997 | Aucsmith |
| 5,721,898 A | 2/1998 | Beardsley et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,805,832 A | 9/1998 | Brown et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,864,738 A | 1/1999 | Kessler et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Handel |
| 5,978,801 A | 11/1999 | Yuasa |
| 5,991,881 A | 11/1999 | Conklin et al. |
| 5,995,963 A | 11/1999 | Nanba et al. |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,067,569 A | 5/2000 | Khaki et al. |
| 6,070,172 A | 5/2000 | Lowe |
| 6,138,176 A | 10/2000 | McDonald et al. |
| 6,147,976 A | 11/2000 | Shand et al. |
| 6,169,969 B1 | 1/2001 | Cohen |
| 6,175,874 B1 | 1/2001 | Imai et al. |
| 6,226,676 B1 | 5/2001 | Crump et al. |
| 6,279,113 B1 | 8/2001 | Vaidya |
| 6,317,795 B1 | 11/2001 | Malkin et al. |
| 6,336,150 B1 | 1/2002 | Ellis et al. |
| 6,339,819 B1 | 1/2002 | Huppenthal et al. |
| 6,370,645 B1 | 4/2002 | Lee et al. |
| 6,377,942 B1 | 4/2002 | Hinsley et al. |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,430,272 B1 | 8/2002 | Maruyama et al. |
| 6,463,474 B1 | 10/2002 | Fuh et al. |
| 6,499,107 B1 | 12/2002 | Gleichauf et al. |
| 6,535,868 B1 | 3/2003 | Galeazzi et al. |
| 6,564,263 B1 | 5/2003 | Bergman et al. |
| 6,578,147 B1 | 6/2003 | Shanklin et al. |
| 6,625,150 B1 | 9/2003 | Yu |
| 6,704,816 B1 | 3/2004 | Burke |
| 6,711,558 B1 | 3/2004 | Indeck et al. |
| 6,765,918 B1 | 7/2004 | Dixon et al. |
| 6,772,345 B1 | 8/2004 | Shetty |
| 6,785,677 B1 | 8/2004 | Fritchman |
| 6,804,667 B1 | 10/2004 | Martin |
| 6,877,044 B2 | 4/2005 | Lo et al. |
| 6,901,461 B2 | 5/2005 | Bennett |
| 6,931,408 B2 | 8/2005 | Adams et al. |
| 6,944,168 B2 | 9/2005 | Paatela et al. |
| 6,978,223 B2 | 12/2005 | Milliken |
| 6,980,976 B2 | 12/2005 | Alpha et al. |
| 6,981,054 B1 | 12/2005 | Krishna |
| 7,019,674 B2 | 3/2006 | Cadambi et al. |
| 7,046,848 B1 | 5/2006 | Olcott |
| 7,093,023 B2 | 8/2006 | Lockwood et al. |
| 7,127,510 B2 | 10/2006 | Yoda et al. |
| 7,139,743 B2 | 11/2006 | Indeck et al. |
| 7,167,980 B2 | 1/2007 | Chiu |
| 7,181,437 B2 | 2/2007 | Indeck et al. |
| 7,181,608 B2 | 2/2007 | Fallon et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,257,842 B2 | 8/2007 | Barton et al. |
| 7,287,037 B2 | 10/2007 | An et al. |
| 7,305,391 B2 | 12/2007 | Wyschogrod et al. |
| 7,356,498 B2 | 4/2008 | Kaminsky et al. |
| 7,386,564 B2 | 6/2008 | Abdo et al. |
| 7,408,932 B2 | 8/2008 | Kounavis et al. |
| 7,411,957 B2 | 8/2008 | Stacy et al. |
| 7,444,515 B2 | 10/2008 | Dharmapurikar et al. |
| 7,454,418 B1 | 11/2008 | Wang |
| 7,457,834 B2 | 11/2008 | Jung et al. |
| 7,461,064 B2 | 12/2008 | Fontoura et al. |
| 7,467,155 B2 | 12/2008 | McCool et al. |
| 7,478,431 B1 | 1/2009 | Nachenberg |
| 7,480,253 B1 | 1/2009 | Allan |
| 7,558,925 B2 | 7/2009 | Bouchard et al. |
| 7,565,525 B2 | 7/2009 | Vorbach et al. |
| 7,636,703 B2 * | 12/2009 | Taylor .................... 706/62 |
| 7,685,254 B2 * | 3/2010 | Pandya .................. 709/217 |
| 7,701,945 B2 | 4/2010 | Roesch et al. |
| 7,702,629 B2 * | 4/2010 | Cytron et al. .......... 707/999.006 |
| 7,783,862 B2 * | 8/2010 | Cameron ................ 712/22 |
| 7,805,392 B1 * | 9/2010 | Steele et al. .......... 706/48 |
| 2001/0014093 A1 | 8/2001 | Yoda et al. |
| 2001/0052038 A1 | 12/2001 | Fallon et al. |
| 2001/0056547 A1 | 12/2001 | Dixon |
| 2002/0031125 A1 | 3/2002 | Sato |
| 2002/0069370 A1 | 6/2002 | Mack |
| 2002/0095512 A1 | 7/2002 | Rana et al. |
| 2002/0105911 A1 | 8/2002 | Pruthi et al. |
| 2002/0129140 A1 | 9/2002 | Peled et al. |
| 2002/0162025 A1 | 10/2002 | Sutton et al. |
| 2002/0166063 A1 | 11/2002 | Lachman et al. |
| 2003/0009693 A1 | 1/2003 | Brock et al. |
| 2003/0014662 A1 | 1/2003 | Gupta et al. |
| 2003/0023876 A1 | 1/2003 | Bardsley et al. |
| 2003/0037037 A1 | 2/2003 | Adams et al. |
| 2003/0043805 A1 | 3/2003 | Graham et al. |
| 2003/0051043 A1 | 3/2003 | Wyschogrod et al. |
| 2003/0065607 A1 | 4/2003 | Satchwell |
| 2003/0065943 A1 | 4/2003 | Geis et al. |
| 2003/0074582 A1 | 4/2003 | Patel et al. |
| 2003/0110229 A1 | 6/2003 | Kulig et al. |
| 2003/0115485 A1 | 6/2003 | Milliken |
| 2003/0163715 A1 | 8/2003 | Wong |
| 2003/0177253 A1 | 9/2003 | Schuehler et al. |
| 2003/0221013 A1 | 11/2003 | Lockwood et al. |
| 2004/0015633 A1 | 1/2004 | Smith |
| 2004/0028047 A1 | 2/2004 | Hou et al. |
| 2004/0049596 A1 | 3/2004 | Schuehler et al. |
| 2004/0054924 A1 | 3/2004 | Chuah et al. |

| | | | |
|---|---|---|---|
| 2004/0064737 | A1 | 4/2004 | Milliken et al. |
| 2004/0100977 | A1 | 5/2004 | Suzuki et al. |
| 2004/0105458 | A1 | 6/2004 | Ishizuka |
| 2004/0111632 | A1 | 6/2004 | Halperin |
| 2004/0162826 | A1 | 8/2004 | Wyschogrod et al. |
| 2004/0177340 | A1 | 9/2004 | Hsu et al. |
| 2004/0196905 | A1 | 10/2004 | Yamane et al. |
| 2004/0205149 | A1 | 10/2004 | Dillon et al. |
| 2005/0005145 | A1 | 1/2005 | Teixeira |
| 2005/0086520 | A1 | 4/2005 | Dharmapurikar et al. |
| 2005/0175010 | A1 | 8/2005 | Wilson et al. |
| 2005/0187974 | A1 | 8/2005 | Gong |
| 2005/0195832 | A1 | 9/2005 | Dharmapurikar et al. |
| 2005/0229254 | A1 | 10/2005 | Singh et al. |
| 2006/0031263 | A1 | 2/2006 | Arrouye et al. |
| 2006/0036693 | A1 | 2/2006 | Hulten et al. |
| 2006/0047636 | A1 | 3/2006 | Mohania et al. |
| 2006/0053295 | A1 | 3/2006 | Madhusudan et al. |
| 2006/0129745 | A1 | 6/2006 | Thiel et al. |
| 2006/0242123 | A1 | 10/2006 | Williams, Jr. |
| 2006/0269148 | A1 | 11/2006 | Farber et al. |
| 2006/0294059 | A1 | 12/2006 | Chamberlain et al. |
| 2007/0011183 | A1 | 1/2007 | Langseth et al. |
| 2007/0067108 | A1 | 3/2007 | Buhler et al. |
| 2007/0078837 | A1 | 4/2007 | Indeck et al. |
| 2007/0112837 | A1 | 5/2007 | Houh et al. |
| 2007/0118500 | A1 | 5/2007 | Indeck et al. |
| 2007/0174841 | A1 | 7/2007 | Chamberlain et al. |
| 2007/0209068 | A1 | 9/2007 | Ansari et al. |
| 2007/0237327 | A1 | 10/2007 | Taylor et al. |
| 2007/0260602 | A1 | 11/2007 | Taylor |
| 2007/0277036 | A1 | 11/2007 | Chamberlain et al. |
| 2007/0294157 | A1 | 12/2007 | Singla et al. |
| 2008/0086274 | A1 | 4/2008 | Chamberlain et al. |
| 2008/0109413 | A1 | 5/2008 | Indeck et al. |
| 2008/0114724 | A1 | 5/2008 | Indeck et al. |
| 2008/0114725 | A1 | 5/2008 | Indeck et al. |
| 2008/0114760 | A1 | 5/2008 | Indeck et al. |
| 2008/0126320 | A1 | 5/2008 | Indeck et al. |
| 2008/0133453 | A1 | 6/2008 | Indeck et al. |
| 2008/0133519 | A1 | 6/2008 | Indeck et al. |
| 2009/0262741 | A1 | 10/2009 | Jungck et al. |

FOREIGN PATENT DOCUMENTS

| | | | |
|---|---|---|---|
| EP | 0851358 | A | 7/1998 |
| EP | 0887723 | | 12/1998 |
| EP | 0911738 | A | 4/1999 |
| JP | 02136900 | A | 5/1990 |
| JP | 03014075 | A | 1/1991 |
| JP | 2000286715 | A | 10/2000 |
| JP | 2002101089 | A | 4/2002 |
| WO | 9905814 | | 2/1999 |
| WO | 9955052 | | 10/1999 |
| WO | 0041136 | A1 | 7/2000 |
| WO | 0122425 | A | 3/2001 |
| WO | 0139577 | | 6/2001 |
| WO | 0161913 | | 8/2001 |
| WO | 0180082 | A2 | 10/2001 |
| WO | 0180558 | | 10/2001 |
| WO | 02061525 | | 8/2002 |
| WO | 02082271 | | 10/2002 |
| WO | 03036845 | | 5/2003 |
| WO | 2004017604 | | 2/2004 |
| WO | 2004042560 | A | 5/2004 |
| WO | 2004042561 | A | 5/2004 |
| WO | 2004042562 | | 5/2004 |
| WO | 2004042574 | A | 5/2004 |
| WO | 2005017708 | A | 2/2005 |
| WO | 2005026925 | | 3/2005 |
| WO | 2005048134 | A | 5/2005 |
| WO | 2006023948 | | 3/2006 |
| WO | 2006096324 | | 9/2006 |
| WO | 2007087507 | | 8/2007 |

OTHER PUBLICATIONS

A method of instance learning based on finite-state automaton and its application on TCM medical cases, Sun Yi; Zhang DeZheng; Zhang Bin; Computer, Mechatronics, Control and Electronic Engineering (CMCE), 2010 International Conference on vol. 6 Digital Object Identifier: 10.1109/CMCE.2010.5609821 Publication Year: 2010 , pp. 427-430.*

Inference of a probabilistic finite state machine from its output, Rouvellou, I.; Hart, G.W.; Systems, Man and Cybernetics, IEEE Transactions on vol. 25 , Issue: 3 Digital Object Identifier: 10.1109/21.364856 Publication Year: 1995 , pp. 424-437.*

Real-time computation by n-dimensional iterative arrays of finite-state machines, Cole, Stephen N.; Switching and Automata Theory, 1966., IEEE Conference Record of Seventh Annual Symposium on Digital Object Identifier: 10.1109/SWAT.1966.17 Publication Year: 1966 , pp. 53-77.*

"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload PlusO Agere System Interface", Agere Systems Product Brief, Jun. 2001, downloaded from Internet, Jan. 2002, pp. 1-6.

"RFC793: Transmission Control Protocol, Darpa Internet Program, Protocol Specification", Sep. 1981.

"Technology Overview", Data Search Systems Incorporated, downloaded from the http://www.datasearchsystems.com/tech.htm on Apr. 19, 2004.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Anonymous, "Method for Allocating Computer Disk Space to a File of Known Size", IBM Technical Disclosure Bulletin, vol. 27, No. 10B, Mar. 1, 1985, New York.

Arnold et al., "The Splash 2 Processor and Applications", Proceedings 1993 IEEE International Conference on Computer Design: VLSI In Computers and Processors (ICCD '93), Oct. 3, 1993, pp. 482-485, IEEE Computer Society, Cambridge, MA USA.

Artan et al., "Multi-packet Signature Detection using Prefix Bloom Filters", 2005, IEEE, pp. 1811-1816.

Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf Baer, "Computer Systems Architecture", 1980, pp. 262-265; Computer Science Press, Potomac, Maryland.

Baeza-Yates et al., "New and Faster Filters for Multiple Approximate String Matching", Random Structures and Algorithms (RSA), Jan. 2002, pp. 23-49, vol. 20, No. 1.

Baker et al., "High-throughput Linked-Pattern Matching for Intrusion Detection Systems", ANCS 2005: Proceedings of the 2005 Symposium on Architecture for Networking and Communication Systems, pp. 193-202, ACM Press, 2005.

Berk, "JLex: A lexical analyzer generator for JavaO", downloaded from http://www.cs.princeton.edu/~appel/modern/java/Jlex/ in Jan. 2002, pp. 1-18.

Black, "Dictionary of Algorithms and Data Structures", NIST 2004, downloaded from http://www.nist.gov/dads/HTML/fractionalKnapsack.html.

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Braun et al., "Layered Protocol Wrappers for Internet Packet Processing in Roconfigurable Hardware", Proceedings of Hot Interconnects 9 (Hotl-9) Stanford, CA, Aug. 22-24, 2001, pp. 93-98.

Cavnar et al., "N-Gram-Based Text Categorization", Proceedings of SDAIR-94, 3rd Annual Symposium on Document Analysis and Information Retrieval, Las Vegas, pp. 161-175, 1994.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Chamberlain et al., "The Mercury System: Embedding Computation Into Disk Drives", 7th High Performance Embedded Computing Workshop, Sep. 2003, Boston, MA.

Chamberlain et al., "The Mercury System: Exploiting Truly Fast Hardware for Data Search", Proc. of Workshop on Storage Network Architecture and Parallel I/Os, Sep. 2003, New Orleans, LA.

Chaney et al., "Design of a Gigabit ATM Switch", Washington University, St. Louis.

Cho et al., "Deep Packet Filter with Dedicated Logic and Read Only Memories", 12th Annual IEEE Symposium on Field-Programmable Custom Computing Machines, Apr. 2004.

Choi et al., "Design of a Flexible Open Platform for High Performance Active Networks", Allerton Conference, 1999, Champaign, IL.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept of ECE, 1999, presented by Yi-Gang Tai.

Cong et al., "An Optional Technology Mapping Algorithm for Delay Optimization in Lookup-Table Based FPGA Designs", IEEE, 1992, pp. 48-53.

Cormen et al., "Introduction to Algorithms", 2nd edition, Cambridge, MA, The MIT Press, 2001.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Dharmapurikar et al., "Deep Packet Inspection Using Parallel Bloom Filters," IEEE Micro, Jan.-Feb. 2004, vol. 24, Issue: 1, pp. 52-61.

Dharmapurikar et al., "Deep Packet Inspection Using Parallel Bloom Filters," Symposium on High Performance Interconnects (HotI), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Dharmapurikar, "Fast and Scalable Pattern Matching for Content Filtering", ACM, ANCS 05, 2005, pp. 183-192.

Ebeling et al., "RaPiD—Reconfigurable Pipelined Datapath", University of Washington, Dept. of Computer Science and Engineering, Sep. 23, 1996, Seattle, WA.

Feldmann, "BLT: Bi-Layer Tracing of HTTP and TCP/IP", AT&T Labs-Research, Florham Park, NJ, USA.

Forgy, "RETE: A fast algorithm for the many pattern/many object pattern matching problem", Artificial Intelligence, 19, pp. 17-37, 1982.

Franklin et al., "An Architecture for Fast Processing of Large Unstructured Data Sets." Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Garey et al., "Computers and Intractability: A Guide to the Theory of NP-Completeness", W.H. Freeman & Co., 1979.

Gavrila et al., "Multi-feature Hierarchical Template Matching Using Distance Transforms", IEEE, Aug. 16-20, 1998, vol. 1, pp. 439-444.

Guerdoux-Jamet et al., "Systolic Filter for Fast DNA Similarity Search", IEEE, 1995, pp. 145-156.

Gunther et al., "Assessing Document Relevance with Run-Time Reconfigurable Machines", FPGAs for Custom Computing Machines, 1996, Proceedings, IEEE Symposium on, pp. 10-17, Napa Valley, CA, Apr. 17, 1996.

Gupta et al., "Packet Classification on Multiple Fields", Computer Systems Laboratory, Stanford University, Stanford, CA.

Gurtov, "Effect of Delays on TCP Performance", Cellular Systems Development, Sonera Corporation, online at http://cs.helsinki.fi/u/gurtov/papers/pwc01.pdf.

Halaas et al., "A Recursive MISD Architecture for Pattern Matching", IEEE Transactions on Very Large Scale Integration, vol. 12, No. 7, pp. 727-734, Jul. 2004.

Hauck et al., "Software Technologies for Reconfigurable Systems", Northwestern University, Dept. of ECE, Technical Report, 1996.

Hayes, "Computer Architecture and Organization", Second Edition, 1988, pp. 448-459, McGraw-Hill, Inc.

Herbordt et al., "Single Pass, Blast-Like, Approximate String Matching on FPGAs", 14th Annual IEEE Symposium on Field-Programmable Custom Computing Machines (FCCM'06), Apr. 2006, pp. 1-10, IEEE.

Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Hopcroft et al., "Introduction to Automata Theory, Languages, and Computation", Addison Wesley, 1979.

Hutchings et al., "Assisting Network Intrusion Detection with Reconfigurable Hardware", FCCM 2002: 10th Annual IEEE Symposium on Field-Programmable Custom Computing Machines, 2002.

International Search Report for PCT/US2001/011255 dated Jul. 10, 2003.

International Search Report for PCT/US2002/033286 dated Jan. 22, 2003.

International Search Report for PCT/US2003/015638 dated May 6, 2004.

International Search Report for PCT/US2004/016021 dated Aug. 18, 2005.

International Search Report for PCT/US2004/016398 dated Apr. 12, 2005.

International Search Report for PCT/US2005/030046; Sep. 25, 2006.

International Search Report for PCT/US2006/045653 dated Jul. 8, 2008.

International Search Report for PCT/US2007/060835 dated Jul. 9, 2007.

International Search Report for PCT/US2007/067319 dated Jan. 11, 2008.

Jacobson et al., "RFC 1072: TCP Extensions for Long-Delay Paths", Oct. 1988.

Jacobson et al., "tcpdump—dump traffic on a network", Jun. 30, 1997, online at www.cse.cuhk.edu.hk/~cslui/CEG4430/tcpdump.ps.gz.

Johnson et al., "Pattern Matching in Reconfigurable Logic for Packet Classification", College of Computing, Georgia Institute of Technology, Atlanta, GA.

Jones et al., "A Probabilistic Model of Information Retrieval: Development and Status", Information Processing and Management, Aug. 1998, 76 pages.

Keutzer et al., "A Survey of Programmable Platforms—Network Proc", University of California-Berkeley, pp. 1-29.

Kulig et al., "System and Method for Controlling Transmission of Data Packets Over an Information Network", pending U.S. Patent Application.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Navarro, "A Guided Tour to Approximate String Matching", ACM Computing Surveys, vol. 33, No. 1, Mar. 2001, pp. 31-88.

Necker et al., "TCP-Stream Reassembly and State Tracking in Hardware", School of Electrical and Computer Engineering, Georgia Institute of Technology, Atlanta, GA.

Niewczas et al., "A Pattern Matching Algorithm for Verification and Analysis of Very Large IC Layouts", ACM, Apr. 1998, pp. 129-134.

Nunez et al., "The X-MatchLITE FPGA-Based Data Compressor", Euromicro Conference 1999, Proceedings, Italy, Sep. 8-10, 1999, pp. 126-132, Los Alamitos, CA.

Office Action for U.S. Appl. No. 11/339,892 dated Jul. 9, 2009.

Partial International Search Report for PCT/US03/15638 dated Feb. 3, 2004.

Prakash et al., "OC-3072 Packet Classification Using BDDs and Pipelined SRAMs", Department of Electrical and Computer Engineering, The University of Texas at Austin.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ramesh et al., "Automatic Selection of Tuning Parameters for Feature Extraction Sequences", IEEE, Jun. 21-23, 1994, pp. 672-677.

Ratha et al., "Convolution on Splash 2", Proceedings of IEEE Symposium on FPGAS for Custom Computing Machines, Apr. 19, 1995, pp. 204-213, Los Alamitos, California.

Ratha et al., "FPGA-based coprocessor for text string extraction", IEEE, Sep. 11-13, 2000, pp. 217-221.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.

Shah, "Understanding Network Processors", Version 1.0, University of California-Berkeley, Sep. 4, 2001.

Shalunov et al., "Bulk TCP Use and Performance on Internet 2", ACM SIGCOMM Internet Measurement Workshop, 2001.

Shirazi et al., "Quantitative Analysis of FPGA-based Database Searching", Journal of VLSI Signal Processing Systems For Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Tan et al., "A High Throughput String Matching Architecture for Intrusion Detection and Prevention", ISCA 2005: 32nd Annual International Symposium on Computer Architecture, pp. 112-122, 2005.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University. Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

West et al., "An FPGA-Based Search Engine for Unstructured Database", Proc. of 2nd Workshop on Application Specific Processors, Dec. 2003, San Diego, CA.

Wooster et al., "HTTPDUMP Network HTTP Packet Snooper", Apr. 25, 1996.

Written Opinion for PCT/US2006/045653 dated Jul. 8, 2008.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.

Asami et al., "Improvement of DES Key Search on FPGA-Based Parallel Machine "Rash"", Proceedings of Information Processing Society, Aug. 15, 2000, pp. 50-57, vol. 41, No. SIG5 (HPS1), Japan.

Cho, "A Fast Regular Expression Indexing Engine", Proc. of 18th Int'l Conv. on Data Engineering, 2001, pp. 1-12.

Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

Franklin et al., "Assisting Network Intrusion Detection with Reconfigurable Hardware", Symposium on Field-Programmable Custom Computing Machines (FCCM 2002), Apr. 2002, Napa, California.

Seki et al., "High Speed Computation of Shogi With FPGA", Proceedings of 58th Convention Architecture, Software Science, Engineering, Mar. 9, 1999, pp. 1-133-1-134.

Yoshitani et al., "Performance Evaluation of Parallel Volume Rendering Machine Re Volver/C40", Study Report of Information Processing Society, Mar. 5, 1999, pp. 79-84, vol. 99, No. 21.

\* cited by examiner $$\backslash\$[0-9]+(\backslash.[0-9]\{2\})\{0,1\}$$
Figure 1 (prior art)
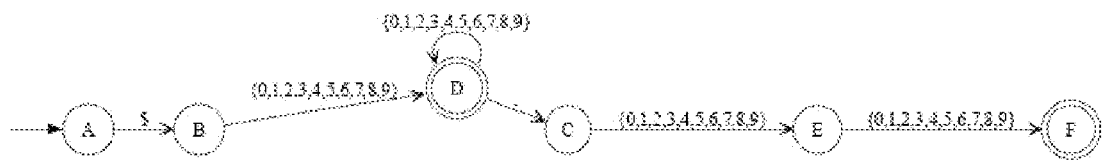
Figure 2 (prior art)
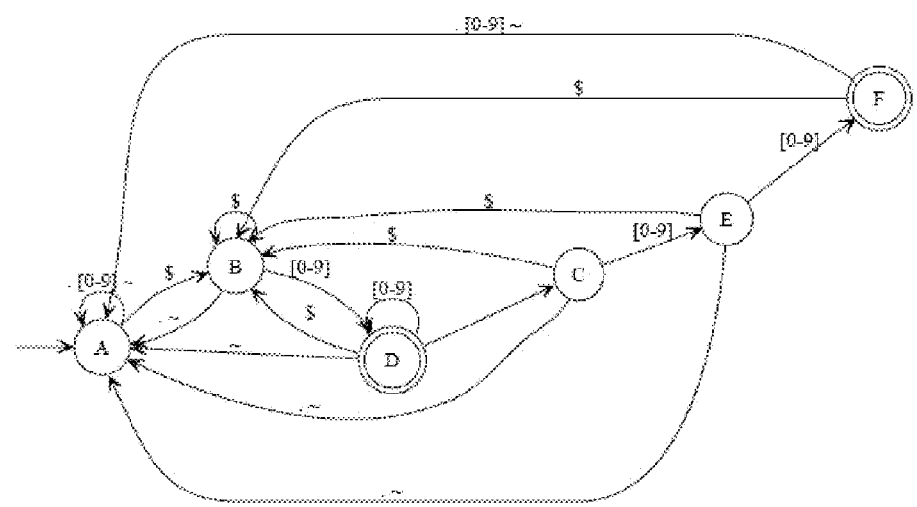
Figure 3
| State | Symbol | | | |
|---|---|---|---|---|
| | 0···9 | . | $ | ~··· |
| A | A···A | A | B | A··· |
| B | D···D | A | B | A··· |
| C | E···E | A | B | A··· |
| D | D···D | C | B | A··· |
| E | F···F | A | B | A··· |
| F | A···A | A | B | A··· |
Figure 4 function DOUBLESTRIDE($\delta^k$) : $\delta^{2k}$
    foreach $q \in Q$ do
        foreach $a \in \Sigma^k$ do
            foreach $b \in \Sigma^k$ do
                $\delta^{2k}(q, ab) \leftarrow \delta^k(\delta^k(q, a), b)$
end function PARTITION($Q, \Sigma, \delta : Q \times \Sigma \mapsto Q$) : ($result, K, \kappa : \Sigma \mapsto K$)
    $WorkList \leftarrow \Sigma$
    $result \leftarrow \emptyset$
    $i \leftarrow -1$
    while $WorkList \neq \emptyset$ do
        $w \leftarrow$ some element of $WorkList$
        $equiv \leftarrow \{ a \in \Sigma \mid \forall q \in Q\ \delta(q, a) = \delta(q, w) \}$
        $i \leftarrow i + 1$
        $K \leftarrow K \cup \{i\}$
        foreach $sym \in equiv$ do $\kappa(sym) \leftarrow i$
        $result \leftarrow result \cup equiv$
        $WorkList \leftarrow WorkList - equiv$
end

Figure 8

| Symbol | ECI |
|---|---|
| $ | 0 |
| . | 1 |
| 0–9 | 2 |
| all else | 3 |

(a)

| State | ECI 0 | 1 | 2 | 3 |
|---|---|---|---|---|
| A | (B,1,0) | (A,1,0) | (A,1,0) | (A,1,0) |
| B | (B,1,0) | (A,1,0) | (D,0,1) | (A,1,0) |
| C | (B,1,0) | (A,1,0) | (E,0,0) | (A,1,0) |
| D | (B,1,0) | (C,0,0) | (D,0,1) | (A,1,0) |
| E | (B,1,0) | (A,1,0) | (A,0,1) | (A,1,0) |

| Symbols | | ECI |
|---|---|---|
| 0 | 0 | 0 |
| 0 | 1 | 1 |
| 0 | 2 | 2 |
| 0 | 3 | 1 |
| 1 | 0 | 0 |
| 1 | 1 | 1 |
| 1 | 2 | 3 |
| 1 | 3 | 1 |
| 2 | 0 | 4 |
| 2 | 1 | 5 |
| 2 | 2 | 6 |
| 2 | 3 | 7 |
| 3 | 0 | 0 |
| 3 | 1 | 1 |
| 3 | 2 | 1 |
| 3 | 3 | 1 |

(a)

| | ECI | | | | | | | |
|---|---|---|---|---|---|---|---|---|
| State | 0 | 1 | 2 | 3 | 4 | 5 | 6 | 7 |
| A | (B,1,0) | (A,1,0) | (D,1,1) | (A,1,0) | (B,1,0) | (A,1,0) | (A,1,0) | (A,1,0) |
| B | (B,1,0) | (A,1,0) | (D,1,1) | (A,1,0) | (B,1,1) | (C,0,1) | (D,0,1) | (A,1,1) |
| C | (B,1,0) | (A,1,0) | (D,1,1) | (A,1,0) | (B,1,0) | (A,1,0) | (A,0,1) | (A,1,0) |
| D | (B,1,0) | (A,1,0) | (D,1,1) | (E,0,0) | (B,1,1) | (C,0,1) | (D,0,1) | (A,1,1) |
| E | (B,1,0) | (A,1,0) | (D,1,1) | (A,1,0) | (B,1,1) | (A,1,1) | (A,1,1) | (A,1,1) |

```
function BASEDFA(Q, Σ, q₀, δ, A, ρ)) : DFA¹ = (Q', Σ', q'₀, K, κ, δ')
   K ← { 0 }
   foreach a ∈ Σ do κ(a) ← 0
   WorkList ← { q₀ }
   while WorkList ≠ ∅ do
      w ← some element of WorkList
      WorkList ← WorkList − { w }
      /*         w is a set of states that is already λ-closed
      /*         q₀ ∈ w by construction
      Q' ← Q' ∪ { w }
      foreach a ∈ Σ do
         targs ← { t | (∃s ∈ w)δ(s,a) = t }
         targs ← LAMBDACLOSURE(targs)
         red ← targs ∩ A ≠ ∅
         green ← (∀s ∈ w − { q₀ })(∀t ∈ Q − { q₀ }) δ(s,a) ≠ t
         δ' ← δ' ∪ { w × a ↦ (targs, green, red) }
         if targs ∉ Q'
         then WorkList ← WorkList ∪ { targs }
end
```

Figure 11

|       | ECI       |          |          |          |
| State | 0         | 1        | 2        | 3        |
| A     | 5(B,1,0)  | 3(A,1,0) | 1(A,1,0) | 5(A,1,0) |
| B     |           |          | 1(D,0,1) |          |
| C     |           |          | 1(E,0,0) |          |
| D     |           | 1(C,0,0) | 1(D,0,1) |          |
| E     |           | 1(A,1,0) | 1(A,0,1) |          |

| 5 | 1 | 1 | 0 | 3 | 0 | 1 | 0 | 1 | 2 | 0 | 0 | 1 | 0 | 1 | 0 | 1 | 0 | 1 | 0 | 1 | 3 | 0 | 1 | 1 | 4 | 0 | 0 | 1 | 3 | 0 | 1 | 1 | 0 | 0 | 1 | 5 | 0 | 1 | 0 |

Figure 15(a) — Indirection Table

| ECI | pointer | index | count |
|---|---|---|---|
| 0 | 0 | 0 | 1 |
| 1 | 0 | 1 | 3 |
| 2 | 1 | 1 | 5 |
| 3 | 3 | 0 | 1 |

Figure 15(b) — Transition Table Memory

| addr | | | |
|---|---|---|---|
| 0 | 5 (B,1,0) | 3 (A,1,0) | 1 (C,0,0) |
| 1 | 1 (A,1,0) | 1 (A,1,0) | 1 (D,0,1) |
| 2 | 1 (E,0,0) | 1 (D,0,1) | 1 (A,0,1) |
| 3 | 5 (A,1,0) | | |

Figure 16(a) — Indirection Table

| ECI | pointer | index | count |
|---|---|---|---|
| 0 | 0 | 0 | 1 |
| 1 | 0 | 1 | 3 |
| 2 | 1 | 1 | 5 |
| 3 | 3 | 0 | 1 |

Figure 16(b) — Transition Table Memory

| addr | | | |
|---|---|---|---|
| 0 | 5 (B,1,0) | 3 (A,1,0) | 4 (C,0,0) |
| 1 | 5 (A,1,0) | 1 (A,1,0) | 2 (D,0,1) |
| 2 | 3 (E,0,0) | 4 (D,0,1) | 5 (A,0,1) |
| 3 | 5 (A,1,0) | | |

Figure 17(a) — Indirection Table

| symbol | ECI | pointer | initial index | terminal index | word count |
|---|---|---|---|---|---|
| $ | 0 | 0 | 0 | 0 | 0 |
| . | 1 | 0 | 1 | 0 | 1 |
| [0-9] | 2 | 1 | 1 | 2 | 1 |
| ~ | 3 | 3 | 0 | 0 | 0 |

Figure 17(b) — Transition Table Memory

| addr | | | |
|---|---|---|---|
| 0 | 5 (B,1,0) | 3 (A,1,0) | 4 (C,0,0) |
| 1 | 5 (A,1,0) | 1 (A,1,0) | 2 (D,0,1) |
| 2 | 3 (E,0,0) | 4 (D,0,1) | 5 (A,0,1) |
| 3 | 5 (A,1,0) | | | function DIFFMATRIX($Q, \Sigma, \delta$) : $D$
    foreach $q \in Q$ do
        foreach $p \in Q$ do
            foreach $s \in \Sigma$ do $\quad D[q][p] \leftarrow D[q][p] + \delta(q,s) \neq \delta(p,s)$
end

Figure 20 function RLOPTIM($Q, q_0, \Sigma, \delta, D$) : $DFA' = (Q', \Sigma, q_0', \delta')$
    $Used \leftarrow \emptyset$
    $cur \leftarrow \text{MAX}(\sum_{i \in Q} D[i])$
    while $Used \neq Q$ do
        $next \leftarrow \text{MAX}(D[curr] - Used)$
        $Used \leftarrow Used \cup \{next\}$
        $cur \leftarrow next$
end

Figure 21

| symbol | ECI | pointer | initial index | terminal index | word count | | addr | | | |
|---|---|---|---|---|---|---|---|---|---|---|
| $ | 0 | 0 | 0 | 0 | 0 | | 0 | 5 (B,1,0) | 4 (A,1,0) | 1 (C,0,0) |
| . | 1 | 0 | 1 | 2 | 0 | | 1 | 1 (A,1,0) | 1 (E,0,0) | 1 (A,0,1) |
| [0-9] | 2 | 1 | 0 | 0 | 1 | | 2 | 2 (D,0,1) | 5 (A,1,0) | |
| ~ | 3 | 2 | 1 | 1 | 0 | | 3 | | | |
| | | Indirection Table | | | | | | Transition Table Memory | | |

Figure 22

```
procedure COLPACK(R, x)
    while R ≠ ∅ do
        longest ← MAXLENGTH(R)
        R ← R − {longest}
        PACK(longest)
        sum ← x − (longest mod x)
        L₀ ← {0}
        foreach col ∈ R do   Lᵢ ← MERGELISTS(Lᵢ₋₁, Lᵢ₋₁ + LENGTH(col))
        remove from Lᵢ every element that is greater than sum
        S ← Max(Lₙ)
        foreach col ∈ S do
            R ← R − {col}
            call PACK(col)
end
```

METHOD AND DEVICE FOR HIGH PERFORMANCE REGULAR EXPRESSION PATTERN MATCHING

CROSS-REFERENCE AND PRIORITY CLAIM TO RELATED PATENT APPLICATION

This patent application is a divisional of patent application Ser. No. 11/293,619, filed Dec. 2, 2005, entitled "Method and Device for High Performance Regular Expression Pattern Matching", now U.S. Pat. No. 7,702,629, the entire disclosure of which is incorporated herein by reference.

FIELD OF THE INVENTION

The present invention relates generally to the field of processing a stream of data symbols to determine whether any strings of the data symbol stream match a pattern.

BACKGROUND AND SUMMARY OF THE INVENTION

Advances in network and storage-subsystem design continue to push the rate at which data streams must be processed between and within computer systems. Meanwhile, the content of such data streams is subjected to ever increasing scrutiny, as components at all levels mine the streams for patterns that can trigger time sensitive action. Patterns can include not only constant strings (e.g., "dog" and "cat") but also specifications that denote credit card numbers, currency values, or telephone numbers to name a few. A widely-used pattern specification language is the regular expression language. Regular expressions and their implementation via deterministic finite automatons (DFAs) is a well-developed field. See Hoperoft and Ullman, *Introduction to Automata Theory, Languages, and Computation*, Addison Wesley, 1979, the entire disclosure of which is incorporated herein by reference. A DFA is a logical representation that defines the operation of a state machine, as explained below. However, the inventors herein believe that a need in the art exists for improving the use of regular expressions in connection with high performance pattern matching.

For some applications, such as packet header filtering, the location of a given pattern may be anchored, wherein anchoring describes a situation where a match occurs only if the pattern begins or ends at a set of prescribed locations within the data stream. More commonly, in many applications, a pattern can begin or end anywhere within the data stream (e.g., unstructured data streams, packet payloads, etc.). Some applications require a concurrent imposition of thousands of patterns at every byte of a data stream. Examples of such applications include but are not limited to:
- network intrusion detection/prevention systems (which typically operate using a rule base of nearly 10,000 patterns (see Roesch, M., "*Snort—lightweight intrusion detection for networks*", LISA '99: 13$^{th}$ Systems Administration Conference, pp. 229-238, 1999, the entire disclosure of which is incorporated herein by reference));
- email monitoring systems which scan outgoing email for inappropriate or illegal content;
- spam filters which impose user-specific patterns to filter incoming email;
- virus scanners which filters for signatures of programs known to be harmful; and
- copyright enforcement programs which scan media files or socket streams for pirated content.

In applications such as these, the set of patterns sought within the data streams can change daily.

Today's conventional high-end workstations cannot keep pace with pattern matching applications given the speed of data streams originating from high speed networks and storage subsystems. To address this performance gap, the inventors herein turn to architectural innovation in the formulation and realization of DFAs in pipelined architectures (e.g., hardware logic, networked processors, or other pipelined processing systems).

A regular expression r denotes a regular language L(r), where a language is a (possibly infinite) set of (finite) strings. Each string is comprised of symbols drawn from an alphabet $\Sigma$. The syntax of a regular expression is defined inductively, with the following basic expressions:
- any symbol $\alpha \in \Sigma$ denotes ($\alpha$);
- the symbol $\lambda$ denotes the singleton set containing an empty (zero-width) string; and
- the symbol $\phi$ denotes the empty set.

Each of the foregoing is a regular language. Regular expressions of greater complexity can be constructed using the union, concatenation, and Kleene-closure operators, as is well-known in the art. Symbol-range specifiers and clause repetition factors are typically offered for syntactic convenience. While any of the well-known regular expression notations and extensions are suitable for use in the practice of the present invention, the description herein and the preferred embodiment of the present invention supports the perl notation and extensions for regular expressions due to perl's popularity.

As noted above, regular expressions find practical use in a plethora of searching applications including but not limited to file searching and network intrusion detection systems. Most text editors and search utilities specify search targets using some form of regular expression syntax. As an illustrative example, using perl syntax, the pattern shown in FIG. 1 is intended to match strings that denote US currency values:
- a backslash "\" precedes any special symbol that is to be taken literally;
- the low- and high-value of a character range is specified using a dash "−";
- the "+" sign indicates that the preceding expression can be repeated one or more times;
- a single number in braces indicates that the preceding expression can be repeated exactly the designated number of times; and
- a pair of numbers in braces indicates a range of repetitions for the preceding expression.

Thus, strings that match the above expression begin with the symbol "$", followed by some positive number of decimal digits; that string may optionally be followed by a decimal point "." and exactly two more decimal digits. In practice, a pattern for such matches may also specify that the match be surrounded by some delimiter (such as white space) so that the string "$347.12" yields one match instead of four matches (i.e., "$3", "$34", "$347", "$347.12").

Applications that use regular expressions to specify patterns of interest typically operate as follows: Given a regular expression r and a target string t (typically the contents of some input stream such as a file), find all substrings of t in L(r). The substrings are typically reported by their position within t. Thus, unless otherwise stated, it is generally intended that the pattern r is applied at every position in the target and that all matches are reported.

The simplest and most practical mechanism for recognizing patterns specified using regular expressions is the DFA, which is formally described as the 5-tuple:

$(Q, \Sigma, q_o, \delta, A)$ where:
- Q is a finite set of states
- $\Sigma$ is an alphabet of input symbols.
- $q_o \in Q$ is the DFA's initial state
- $\delta$ is a transition function: $Q \times \Sigma \mapsto Q$
- $A \subset Q$ is a set of accepting states A DFA operates as follows. It begins in state $q_o$. If the DFA is in state q, then the next input symbol a causes a transition determined by $\delta(q, a)$. If the DFA effects a transition to a state $q \in A$, then the string processed up to that point is accepted and is in the language recognized by the DFA. As an illustrative example, the regular expression of FIG. 1 can be translated into the canonical DFA shown in FIG. 2 using a sequence of well-known steps, including a step that makes the starting position for a match arbitrary (unanchored) (see the Hoperoft and Ullman reference cited above). For convenience, the DFA of FIG. 2 uses the term "[0-9]" to denote the set {0, 1, 2, 3, 4, 5, 6, 7, 8, 9} and uses the symbol "~" to denote all symbols of $\Sigma$ not in the set {0, 1, 2, 3, 4, 5, 6, 7, 8, 9, $, .}.

The construction of a DFA typically involves an intermediate step in which a nondeterministic finite automaton (NFA) is constructed. An NFA differs from a DFA in that whereas a DFA is a finite state machine that allows at most one transition for each input symbol and state, an NFA is a finite state machine that allows for more than one transition for each input symbol and state. Also, every regular language has a canonical DFA that is obtained by minimizing the number of states needed to recognize that language. Unless specified otherwise herein, it should be assumed that all automata are in canonical (deterministic) form.

However, for the purpose of pattern matching, the inventors herein believe that the DFA shown in FIG. 2 is deficient in the following respects:

Symbols not in the alphabet of the regular expression will cause the DFA to block. For pattern-matching, such symbols should be ignored by a DFA so that it can continue to search for matches. This deficiency can be overcome by completing the DFA as follows:

The alphabet is widened to include any symbol that might occur in the target string. In this description, it is assumed that $\Sigma$ is the ASCII character set comprising 256 symbols.

The DFA is augmented with a new state U: $Q \leftarrow Q \cup \{U\}$

The transition function $\delta$ is completed by defining $\delta(q, a) = U$ for all $q \in Q$, $a \in \Sigma$ for which $\delta$ was previously undefined.

A match will be found only if it originates at the first character of the target string. Pattern-matching applications are concerned with finding all occurrences of the denoted pattern at any position in the target. This deficiency can be overcome by allowing the DFA to restart at every position. Formally, a $\lambda$ transition is inserted from every $q \in Q$ to $q_o$.

The result of the above augmentation is an NFA that can be transformed into a canonical DFA through known techniques to obtain the DFA. FIG. 3 provides an illustrative example of such a canonical DFA.

A DFA is typically implemented interpretively by realizing its transitions $\delta$ as a table: each row corresponds to a state of the DFA and each column corresponds to an input symbol. The transition table for the DFA of FIG. 3 is shown in FIG. 4. If the alphabet $\Sigma$ for the DFA is the ASCII character set (as is often the case in many applications), then the transition table of FIG. 4 would have 256 columns. Each entry in the transition table of FIG. 4 comprises a next state identifier. The transition table of FIG. 4 works thusly: if the DFA's current state is B and the next input symbol is 2, then the transition table calls for a transition to state D as "D" is the next state identifier that is indexed by current state B and input symbol 2. In the description herein, states are labeled by letters to avoid confusion with symbol encodings. However, it is worth noting that in practice, states are typically represented by an integer index in the transition table.

The inventors herein believe that the pattern matching techniques for implementing DFAs in a pipelined architecture can be greatly improved via the novel pattern matching architecture disclosed herein. According to one aspect of the present invention, a pipelining strategy is disclosed that defers all state-dependent (iterative, feedback dependent) operations to the final stage of the pipeline. Preferably, transition table lookups operate to retrieve all transition table entries that correspond to the input symbol(s) being processed by the DFA. Retrievals of transition entries from a transition table memory will not be based on the current state of the DFA. Instead, retrievals from the transition table memory will operate to retrieve a set of stored transition entries based on data corresponding to the input symbol(s) being processed.

In a preferred embodiment where alphabet encoding is used to map the input symbols of the input data stream to equivalence class identifiers (ECIs), these transition table entries are indirectly indexed to one or more input symbols by data corresponding to ECIs.

This improvement allows for the performance of single-cycle state transition decisions, enables the use of more complex compression and encoding techniques, and increases the throughput and scalability of the architecture.

According to another aspect of the present invention, the transitions of the transition table preferably include a match flag that indicates whether a match of an input symbol string to the pattern has occurred upon receipt of the input symbol(s) that caused the transition. Similarly, the transitions of the transition table preferably include a match restart flag that indicates whether the matching process has restarted upon receipt of the input symbol(s) that caused the transition. The presence of a match flag in each transition allows for the number of states in the DFA to be reduced relative to traditional DFAs because the accepting states can be eliminated and rolled into the match flags of the transitions. The presence of a match restart flag allows the DFA to identify the substring of the input stream that matches an unanchored pattern. Together, the presence of these flags in the transitions contribute to another aspect of the present invention—wherein the preferred DFA is configured with an ability to scale upward in the number of bytes processed per cycle. State transitions can be triggered by a sequence of m input symbols, wherein m is greater than or equal to 1 (rather than being limited to processing only a single input symbol per clock cycle). Because of the manner by which the transitions include match flags and match restart flags, as disclosed herein, the DFA will still be able to detect when and where matches occur in the input stream as a result of the leading or an intermediate input symbol of the sequence of m input symbols that are processed together by the DFA as a group.

According to yet another aspect of the present invention, incremental scaling, compression and character-encoding techniques are used to substantially reduce the resources required to realize a high throughput DFA. For example, run-length coding can be used to reduce the amount of memory consumed by (i.e., compress) the DFA's transition table. Furthermore, the state selection logic can then operate on the run-length coded transitions to determine the next state for the DFA. Masking can be used in the state selection logic to remove from consideration portions of the transition table memory words that do not contain transitions that correspond to the ECI of the input symbol(s) being processed.

Also, according to yet another aspect of the present invention, a layer of indirection can be used to map ECIs to transitions in the transition table memory. This layer of indirection allows for the use of various optimization techniques that are effective to optimize the run-length coding process for the transition entries in the transition table memory and optimize the process of effectively packing the run-length coded transition entries into words of the transition table memory such that the number of necessary accesses to transition table memory can be minimized. With the use of indirection, the indirection entries in the indirection table memory can be populated to configure the mappings of ECIs to transition entries in the transition table memory such that those mappings take into consideration any optimization processes that were performed on the transition entries in the transition table memory.

Furthermore, according to another aspect of the present invention, disclosed herein is an optimization algorithm for ordering the DFA states in the transition table, thereby improving the DFA's memory requirements by increasing the efficiency of the run-length coded transitions.

Further still, disclosed herein is an optimization algorithm for efficiently packing the transition table entries into memory words such that the number of transition table entries sharing a common corresponding input symbol (or derivative thereof such as ECI) that span multiple memory words is minimized. This memory packing process operates to improve the DFA's throughput because the efficient packing of memory can reduce the number of memory accesses that are needed when processing one or more input symbols.

According to another aspect of the present invention, the patterns applied during a search can be changed dynamically without altering the logic of the pipeline architecture itself. A regular expression compiler need only populate the transition table memory, indirection table, ECI mapping tables, and related registers to reprogram the pattern matching pipeline to a new regular expression.

Based on the improvements to DFA design presented herein, the inventors herein believe that the throughput and density achieved by the preferred embodiment of the present invention greatly exceed other known pattern matching solutions.

These and other inventive features of the present invention are described hereinafter and will be apparent to those having ordinary skill in the art upon a review of the following specification and figures.

BRIEF DESCRIPTION OF THE DRAWINGS

FIG. 1 depicts an exemplary regular expression;
FIG. 2 depicts a DFA for the regular expression of FIG. 1;
FIG. 3 depicts an improved DFA for the regular expression of FIG. 1;
FIG. 4 depicts a conventional transition table for the DFA of FIG. 3.

FIG. 8 depicts a preferred algorithm for encoding input symbols into equivalence class identifiers (ECIs);
FIGS. 9(a) and (b) depict a preferred transition table for the DFA of FIG. 7;
FIGS. 10(a) and (b) depict transition tables for the regular expression of FIG. 1 wherein the stride of the DFA is equal to 2 input symbols per cycle;
FIG. 11 depicts a preferred algorithm for constructing a base $DFA^1$ from d and p;
FIGS. 15(a) and (b) depict an indirection table and a memory in which the run-length coded transition table of FIGS. 12 and 13 is stored;
FIGS. 16(a) and (b) depict an indirection table and a memory in which the run-length coded transition table of FIG. 15 include precomputed run-length prefix sums;
FIGS. 17(a) and (b) depict an alternative formulation of the Indirection Table and TTM in which the run-length coded transition table of FIG. 14 include precomputed run-length prefix sums;
FIGS. 19(a) and (b) respectively illustrate an exemplary transition table that has been optimized by state re-ordering, and the run length-coded version of the state re-ordered transition table;
FIG. 20 depicts a preferred algorithm for calculating the difference matrix used to optimize the run-length coding for the TTM;
FIG. 21 depicts a preferred algorithm for optimization of run-length coding in the TTM;
FIG. 22 depicts an example of a coded transition table that has been packed into the TTM.

DETAILED DESCRIPTION OF THE PREFERRED EMBODIMENTS

Figure 5:
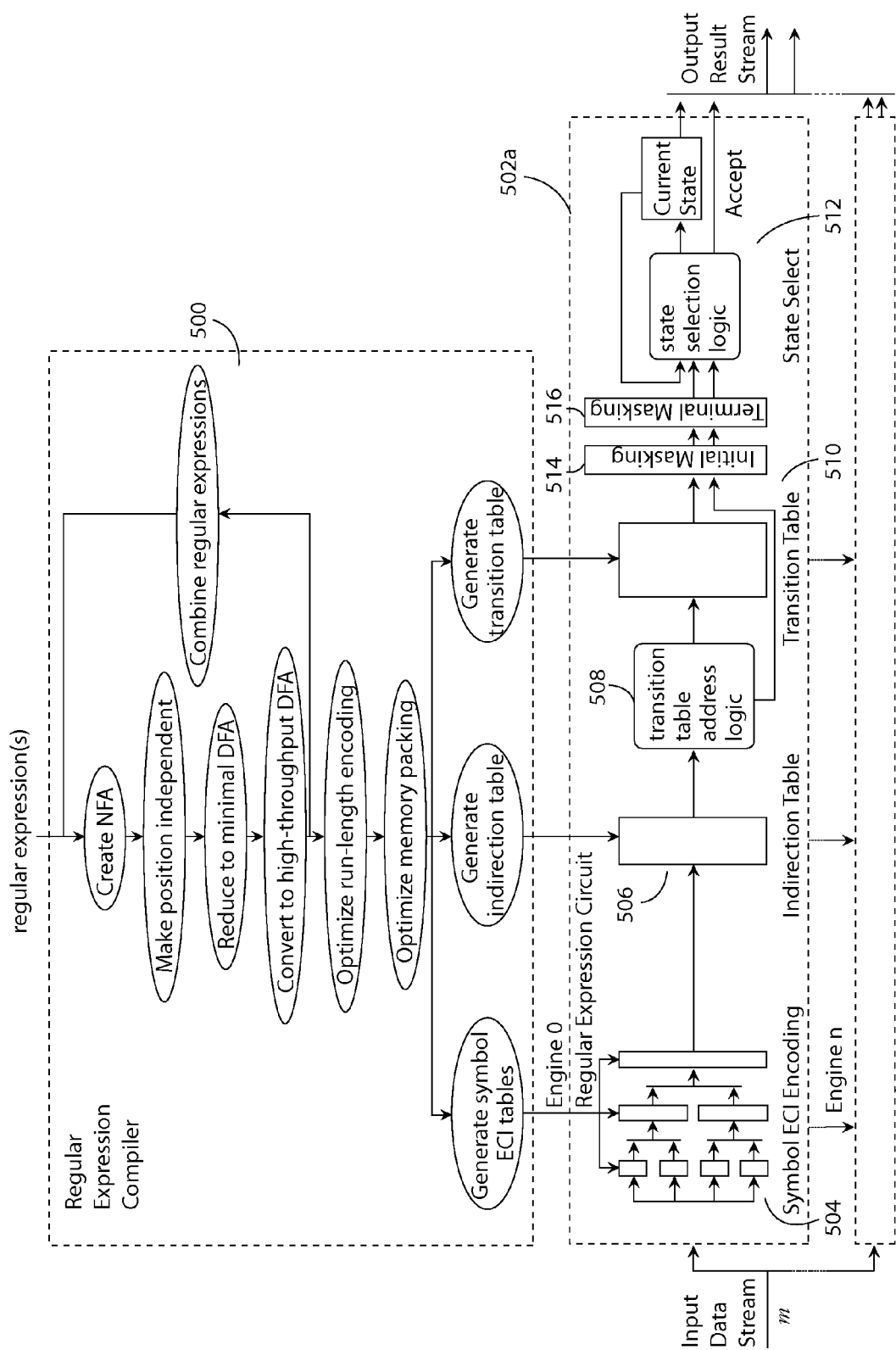
FIG. 5 illustrates a block diagram overview of a preferred embodiment of the present invention.

FIG. 5 depicts an overview of the preferred embodiment of the present invention. The architecture of the preferred embodiment is illustrated within the regular expression circuit 502, which serves as a pattern matching circuit that operates on an input data stream comprising a plurality of sequential input symbols. Preferably, the regular expression circuit 502 is implemented in hardware logic (e.g., reconfigurable hardware logic such as an FPGA or nonreconfigurable hardware logic such as an ASIC). It is worth noting that one or more of the regular expression circuits 502 (e.g., 502a, ..., 502n) can be implemented on the same device if desired by a practitioner of the present invention, which is also reflected in FIG. 24. Also, the regular expression circuit can be implemented in other pipelined architectures, such as multi-processor systems, wherein each processor would serve as a pipeline stage of the regular expression circuit. In such an example, the different processors of the pipeline can be networked together.

The data tables and relevant registers of the regular expression circuit are preferably populated by the output of the regular expression compiler 500. Regular expression compiler 500 operates to process a specified (preferably user-specified) regular expression to generate the DFA that is realized by the regular expression circuit 502 as described herein. Preferably, regular expression compiler 500 is implemented in software executed by a general purpose processor such as the CPU of a personal computer, workstation, or server.

Regular expression compiler 500 can be in communication with regular expression circuit 502 via any suitable data communication technique including but not limited to networked data communication, a direct interface, and a system bus.

The regular expression circuit 502 preferably realizes the DFA defined by one or more specified regular expressions via a plurality of pipelined stages. A first pipeline stage is preferably an alphabet encoding stage 504 that produces an ECI output from an input of m input symbols, wherein m can be an integer that is greater than or equal to one. A second pipeline stage is preferably an indirection table memory stage 506. The indirection table memory stage 506 can be addressed in a variety of ways. Preferably, it is directly addressed by the ECI output of the alphabet encoding stage 504. A third pipeline stage is the transition table logic stage 508 that operates to receive an indirection table entry from the output of the indirection table memory stage 506 and resolve the received indirection entry to one or more addresses in the transition table memory stage 510. The transition table logic stage 508 also preferably resolves the received indirection table entry to data used by the state selection logic stage 512 when the stage selection logic stage processes the output from the transition table memory stage 510 (as described below in connection with the masking operations).

The transition table memory stage 510 stores the transitions that are used by the DFA to determine the DFA's next state and determine whether a match has been found. The state selection logic stage 512 operates to receive one or more of the transition entries that are output from the transition table memory stage 510 and determine a next state for the DFA based on the DFA's current state and the received transition(s). Optionally, the masking operations 514 and 516 within the state selection logic stage 512 that are described below can be segmented into a separate masking pipeline stage or two separate masking pipeline stages (an initial masking pipeline stage and a terminal masking pipeline stage). Additional details about each of these stages is presented herein.

High-Throughput DFAs

A conventional DFA processes one input symbol (byte) at a time, performing a table lookup on each byte to determine the next state. However, modern communication interfaces and interconnects often transport multiple bytes per cycle, which makes the conventional DFA a "bottleneck" in terms of achieving higher throughput. Throughput refers to the rate at which a data stream can be processed—the number of bytes per second that can be accommodated by a design and its implementation.

An extension of conventional DFAs is a DFA that allows for the performance of a single transition based on a string of m symbols. See Clark and Schimmel, "*Scalable pattern matching for high speed networks*", IEEE Symposium on Field-Programmable Custom Computing Machines, April 2004, the entire disclosure of which is incorporated herein by reference. That is, the DFA processes the input stream in groups of m input symbols. Formally, this adaptation yields a DFA based on the alphabet $\Sigma^m$; the corresponding transition table is of size $|Q||\Sigma|^m$. This apparently dramatic increase in resource requirements is mitigated by the compression techniques described herein. For convenience, we let $\delta^m$ denote a transition function that operates on sequences of length m, with $\delta = \delta^1$.

As an illustrative example, consider doubling the effective throughput of the DFA shown in FIG. 3 by processing two bytes at a time (m=2). Based on the table in FIG. 4, if the current state is E, then the input sequence "2$" would result in a transition to state B: $\delta^2(E, 2\$) = \delta(\delta(E, 2), \$) = B$. By accounting for all such two-character sequences, a complete transition table can be computed for this higher-throughput DFA as explained below.

In general, an algorithm for constructing $\delta^3$ for a given DFA is straightforward. The set of states is unchanged and the transition function (table) is computed by simulating progress from each state for every possible sequence of length m. That algorithm takes time $\theta(|Q||\Sigma|^m m)$ to compute a table of size $\theta(|Q||\Sigma|^m)$. A faster algorithm can be obtained by the following form of dynamic programming. Consider $$m = 2^i, i > 0 \text{ and a string } x = x_l x_r, |x_l| = |x_r| = \frac{m}{2}$$

Then $$\forall q \delta^m(q, x) = \delta^{\frac{m}{2}}(\delta^{\frac{m}{2}}(q, x_l), x_r)$$

Figures 6, 7:
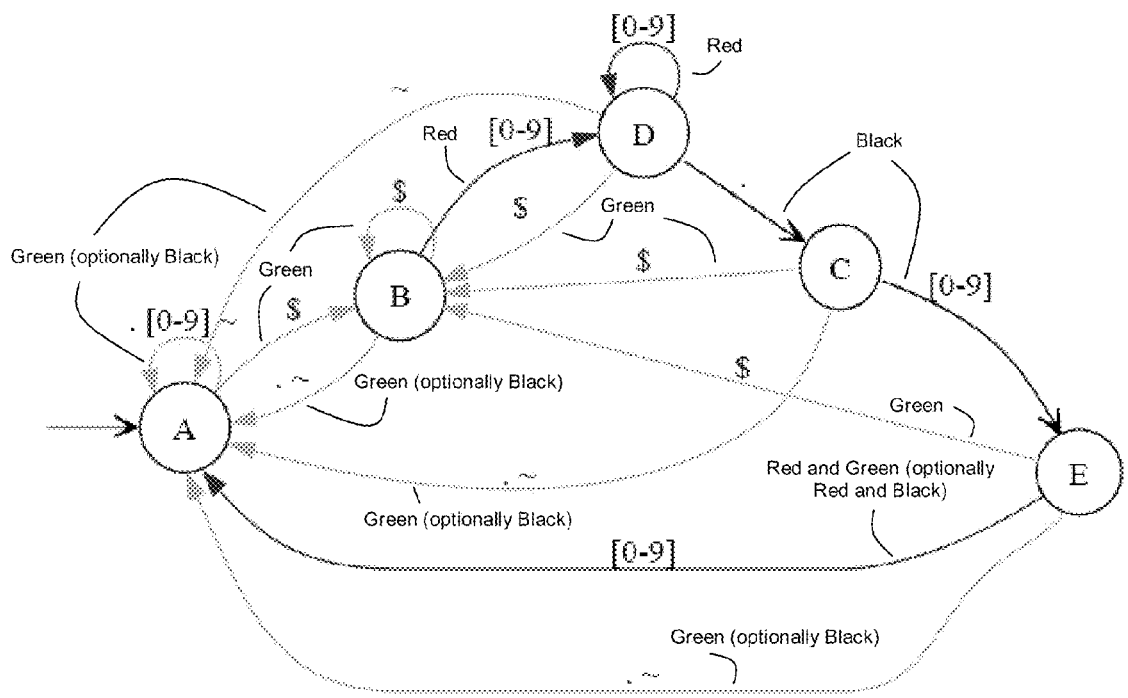
FIG. 6 depicts a preferred algorithm for doubling the stride of a DFA.
FIG. 7 depicts a DFA in accordance with the preferred embodiment of the present invention having a reduced number of states and flags within the transition for matches and match restarts.

An algorithm based on the above proposition is shown in FIG. 6.

To obtain higher throughput DFAs, the algorithm in FIG. 6 can be invoked repeatedly, each time doubling the effective number of symbols processed per cycle. This reduces the complexity of computing $\delta^m$ to $O(|Q||\Sigma|^m \log m)$. Moreover, by identifying redundant columns, the effective alphabet of each table can be substantially reduced in practice through encoding, as described in the Alphabet Encoding section below.

High-Throughput DFAs: Accepts

Because the higher throughput DFA performs multiple transitions per cycle, it can traverse an accepting state of the original DFA during a transition. We therefore augment the transition function to include whether an accepting state is traversed in the trace:

$$\delta^m: Q \times \Sigma^m \to Q \times \{0, 1\}$$

The range's second component indicates whether the sequence of symbols that caused the transition contains a nonempty prefix that takes the original DFA through an accept state.

Transition functions of this form obviate the need for a set of accepting states A, because the "accept" (match) information is associated with edges of the higher throughput DFA. This is formalized via the modified DFA we define in the "Synergistic Combination of Stride and Encoding" section below.

For m>1, accepts are now imprecise because the preferred DFA does not keep track of which intermediate symbol actually caused an accept (match) to occur. To favor speed, the high-throughput DFA can be configured to allow imprecise accepts, relegating precise determination of the accept point to software postprocessing.

High-Throughput DFAs: Restarts

As previously discussed, a pattern-matching DFA for a regular expression is preferably augmented with transitions that allow matches to occur throughout the target string. Because matches can occur at any starting position in the target, an accept should report the origination point of the match in the target. It is not clear in the automaton of FIG. 3 when the origination point is set. For example, all transitions to state A set the origination point, but so do transitions on "$" to state B. Considering transitions from E to A, a "~" or "." is a restart, while a digit is an accept.

The λ-transitions introduced to achieve position independence of matching result in an NFA that can be transformed into a DFA through the usual construction. The "Synergistic Combination of Stride and Encoding" section below describes how to modify that construction to identify transitions that serve only to restart the automaton's matching process.

Formally, the transition function is augmented once more, this time to indicate when restarts occur:

$$\delta^1: Q \times E^m \rightarrow Q \times (0,1) \times (0,1)$$

The first flag indicates a restart transition (a "match restart" flag) and the second flag indicates an accept transition (a "match" flag). Accordingly, the DFA diagrams henceforth show restart transitions with green edges and accept transitions with red edges. For example, FIG. 7 shows an illustrative example of a diagram for an automaton that processes one symbol at a time and recognizes the language denoted by FIG. 1. Optionally, the edges for the transitions to State A can be coded as black and flagged accordingly, with only the edges for the transitions to State B being coded as green and flagged accordingly.

Figures 23, 24:
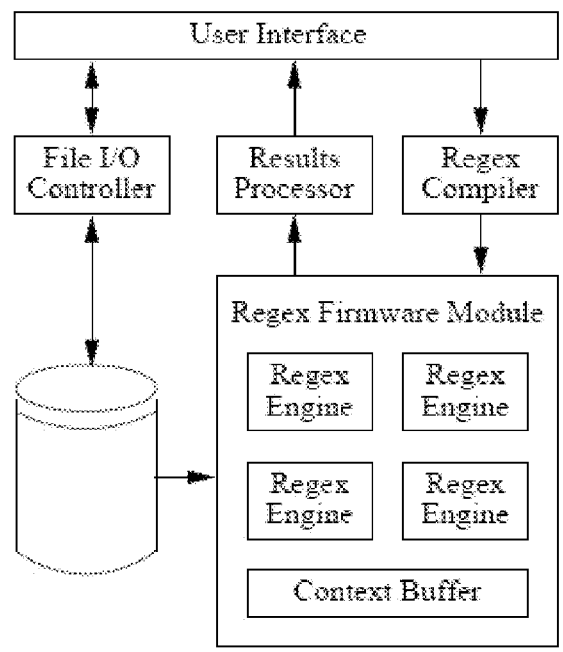
FIG. 23 depicts a preferred algorithm for optimal packing of memory words.
FIG. 24 depicts a preferred regular expression system architecture.

The actions of a DFA with the colored edges are as follows. The automaton includes context variables b and e to record the beginning and end of a match; initially, b=e=0, and the index of the first symbol of the target is 1. These variables allow the location of a matching string to be found in the context buffer as shown in FIG. 24. Transitions are then performed as follows:

black: e is advanced by m—the stride of the automaton, which is the length of the input string that caused the transition. In FIG. 6, m=1. A match is in progress and the portion of the target string participating thus far begins at position b and ends at position e, inclusively.

red only: e is advanced by m and a match is declared. The target substring causing the match starts at position b and ends at position e.

green only: b is advanced by m and e is set to b. The automaton is restarting the match process.

red and green: The red action is performed before the green action.

FIG. 9 shows the associated transition table for the DFA of FIG. 7, wherein each transition entry in the transition table includes a match flag and a match restart flag in addition to the next state identifier. Because information about accepts is associated with edges (the δ function), a DFA with colored edges can have fewer states than the canonical DFA.

The use of match flags and match restart flags is particularly useful when scaling the DFA to process multiple input symbols per cycle. FIG. 10(b) illustrates a transition table for the regular expression of FIG. 1 wherein m is equal to 2. FIG. 10(a) depicts the symbol encoding for this example. Thus, even when processing multiple input symbols per cycle, the DFA will be able to detect when matches and restarts occur on the leading or an intermediate symbol of the group m of input symbols because the flags will carry match status information rather than the states.

Alphabet Encoding

As described above, the size of the transition table (δ) increases exponentially with the length of the input sequence consumed in each cycle. In this section, techniques are presented to encode the symbol alphabet, the goal of which is to mitigate the transition table's size and thus maximize the number of symbols processed per cycle.

Frequently, the set of symbols used in a given regular expression is small compared with the alphabet Σ of the search target. Symbols present in the target but not denoted in the pattern will necessarily be given the same treatment in the DFA for the regular expression. More generally, it may be the case that the DFA's behavior on some set of symbols is identical for all symbols in that set. As an illustrative example, the regular expression in FIG. 1 uses only a small fraction of the ASCII character set. The transitions for digits are the same in the DFA shown in FIG. 3, and the symbol "~" stands for all symbols of the ASCII set that are not in the set {0, 1, 2, 3, 4, 5, 6, 7, 8, 9, $, .}.

While a regular expression may mention character classes explicitly, such as "[0-9]", a more general approach is achieved by analyzing a DFA for equivalent state-transition behavior. Formally, if $$(\exists a \in \Sigma)(\exists b \in \Sigma)(\forall q \in Q)\delta(q, a) = \delta(q, b)$$

then it can be said that a and b are "transition equivalent."

Given a transition table δ: $Q \times \Sigma \mapsto Q$, an $O(|Sigma|^2|Q|)$ algorithm for partitioning Σ into equivalence classes is shown in FIG. 8. Using the example of FIG. 1, the algorithm develops the equivalence classes of symbols suggested in FIG. 1 to form the 4 columns shown in FIG. 9(b). The partition is represented by a set of integers K and a mapping κ from Σ to K. Because alphabet symbol-equivalence is determined by state equivalence, the best result is obtained if δ corresponds to a canonical DFA, with state equivalence already determined.

Computing equivalence classes using the DFA, rather than inspection of its associated regular expression, is preferred for the following reasons:

The regular expression may be specified without using ranges or other gestures that may imply equivalence classes. As an illustrative example, a and b can be made equivalent in the DFA for the regular expression "(ac)| (bc)", but their equivalence is not manifest in the regular expression.

Equivalence classes often cannot be determined by local inspection of a regular expression. As an illustrative example, the regular expression "[0-9]a|5c" contains the phrase "[0-9]", but one element of that range (5) will not share identical transitions with the other symbols because of the other phrase. The appropriate partition in this case is {{0, 1, 2, 3, 4, 6, 7, 8, 9}, {5}}

Formally, the function in FIG. 8 creates a partition—a set, each element of which is a set of symbols in Σ that are treated identically in the DFA. The function produces a more convenient form of that partition in κ, which maps each symbol to an integer denoting its equivalence class (the integer serving as an "equivalence class identifier" (ECI)). A DFA based on symbol encodings then operates in the following two stages. First, the next input symbol is mapped by K to its ECI that represents its equivalence class as determined by the algorithm in FIG. 8. Second, the DFA can use its current state and the ECI to determine the DFA's next state.

Based on the ideas presented thus far, FIG. 7 shows an illustrative example of a DFA that processes a single symbol at a time, with red edges indicating "accept" and green edges indicating "restart". Analysis using the algorithm in FIG. 8 yields the symbol encoding shown in FIG. 9(a) and the transition table shown in FIG. 9(b). As shown in FIG. 9(b), each entry in the transition table is indexed by data corresponding to the DFA's state and by data corresponding to the ECI for a group of m input symbols. FIGS. 10(a) and (b) show the counterpart ECI table and transition table for the regular expression of FIG. 1 where 2 input symbols are processed at a time.

Each transition in the transition table is a 3-tuple that comprises a next state identifier, a match restart flag and a match flag. For example, the transition indexed by state D and ECI 0 is (B, 1, 0) wherein B is the next state identifier, wherein 1 is the match restart flag, and wherein 0 is the match flag. Thus, the transition from state D to B caused by ECI 0 can be interpreted such that ECI 0 did not cause a match to occur but did cause the matching process to restart.

Synergistic Combination of Stride and Encoding

The ideas of improving throughput and alphabet encoding discussed above are now combined to arrive at an algorithm that consumes multiple bytes per cycle and encodes its input to save time (in constructing the tables) and space (in realizing the tables at runtime).

Such a new high-throughput DFA$^m$ can now be formally described as the 6-tuple $(Q, \Sigma, q_o, K, \kappa, \delta)$ where:
  Q is a finite set of states
  $\Sigma$ is an alphabet of the target's input symbols
  $q_o \in Q$ is an initial state
  K is a set of integers of size $Q(|\Sigma|^m)$ (but expected to be small in practice)
  $\kappa$ is a function $\kappa^m \mapsto K$ that maps m input symbols at a time to their encoding
  $\delta$ is a function $Q \times K \mapsto Q \times \{0, 1\} \times \{0, 1\}$ that maps the current state and next substring of m symbols to a next state, a possible restart, and a possible accept.

The set of transformations begins with a regular expression r and perform the following steps to obtain DFA$^m$:
  1. A DFA d is constructed for one or more regular expressions r in the usual way (see the Hoperoft and Ullman reference cited above). For example, as discussed above, the regular expression in FIG. 1 results in the DFA shown in FIG. 3.
  2. An set of transitions p is computed that would allow the automaton to accept based on starting at any position in the target. This is accomplished by simulating for each state a $\lambda$-transition to $q_o$. Specifically, $\rho$ is computed as follows:
    $\rho \leftarrow \phi$
    foreach $\phi \in Q$ do
      foreach $a \in \Sigma$ do $\rho \leftarrow \rho \cup \{(p, a) \mapsto \delta(qo, a)\}$
  3. From d and p, the base DFA$^1$ is constructed by the algorithm in FIG. 11.
  4. State minimization is performed on a high-throughput DFA by a standard algorithm (see the Hoperoft and Ullman reference cited above), except that states are initially split by incoming edge color (black, green, red), instead of by whether they are final or nonfinal states in a traditional DFA.
  5. Given a DFA$^k$, a higher throughput DFA$^{2k}$ with alphabet encoding is constructed by the algorithm shown in FIG. 6.

Transition Table Compression Via Run-Length Coding

The transition table for the preferred high-throughput DFA may contain $|K| \times |Q|$ entries. State minimization attempts to minimize $|Q|$ and the previous discussion regarding the combination of higher throughput and alphabet encoding attempts to minimize $|K|$. Nonetheless, storage resources are typically limited; therefore, a technique for accommodating as many tables as possible should be addressed. The following addresses this matter by explaining how to compress the table itself.

Based on the discussion above, a transition table cell contains the three-tuple: (next state, start flag, accept flag). Run-length coding is a simple technique that can reduce the storage requirements for a sequence of symbols that exhibits sufficient redundancy. The idea is to code the string a'' as the run-length n and the symbol a; the notation n(a) can be used. Thus, the string aaaabbbcbbaaa is run-length coded as 4(a)3 (b)1(c)2(b)3(a). If each symbol and each run-length requires one byte of storage, then run-length coding reduces the storage requirements for this example by three bytes (from 13 bytes to 10 bytes).

Figures 12, 13, 14:
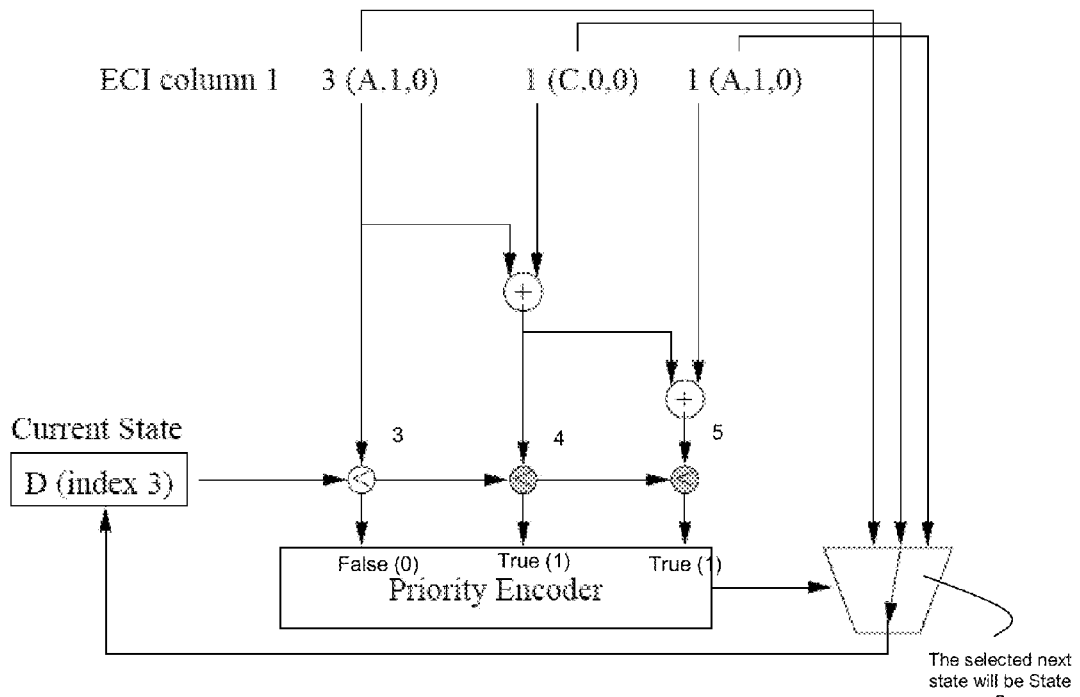
FIG. 12 depicts an exemplary run-length coded transition table.
FIG. 13 depicts an adjacently-stored version of the run-length coded transition table of FIG. 12.
FIG. 14 depicts an exemplary state selection logic circuit for determining a next state based on a retrieved set of run-length coded transitions that correspond to a given ECI.

Examining the example of FIG. 9(b), there is ample opportunity for run-length coding in the columns of the transition table. For the encoded ECI symbols 0 and 3, the table specifies the same three-tuple for every previous state, so the run-length coding prefix for the transitions in the table indexed by ECIs 0 and 3 are both "5". In general, what is expected in transition tables is common "next-state" behavior. Thus, the number of unique entries in each column of the transition table is typically smaller than the number of states in the DFA. FIG. 12 contains a run-length coded version of the transition table in FIG. 9.

While column compression can save storage, it appears to increase the cost of accessing the transition table to obtain a desired entry. Prior to compression, a row is indexed by the current state, and the column is indexed by the ECI. Once the columns are run-length coded, as shown in FIG. 12, the compressed contents of each column are stored adjacently, as shown in FIG. 13. In this example, the states themselves have also been encoded as integers (with A represented by 0, B by 1, etc.). There are now two steps to determining the DFA's next state and actions:
  1. Based on the next ECI encoded from the input, the relevant range of entries is found in the storage layout shown in FIG. 13. This lookup can be performed using a mapping from ECI to offset in the storage layout. The range of entries is a compressed column from FIG. 12. In FIG. 13, the underscored entries correspond to ECI 1 from FIG. 12.
  2. Based on the current state, the next state and action flags must be found in the relevant range of entries. This logic, called state selection, essentially requires decompressing the entries to discover which entry corresponds to the index of the current state.

If an entire compressed column is available, the circuit shown in FIG. 14 depicts an example of how state selection can be realized by interpreting the compressed form and the current state to determine the appropriate tuple entry. For each entry in the run-length coded column, the sum of its run-length prefix and the run-length prefixes of the preceding entries are computed. The current state index is then compared with each sum and the first (leftmost in the example of FIG. 14) entry whose sum is greater than the current state index is selected by the priority encoder. The priority encoder can then determine the next state for the DFA.

FIG. 14 shows an illustrative example of state selection in progress for ECI 1 of FIG. 12. Each "<" node compares the current state index (3 in this example, or State D) with the sum of run-length prefixes in the compressed column. If state index 0 (State A) were supplied as the current state, all three comparators would output "1" and the priority encoder would pick the leftmost one, choosing (A,1,0) as the contents. In FIG. 14, the current state is 3, which is less than the second sum (3+1) and the third sum (3+1+1), so that the right two comparators output "1". The priority encoder picks the leftmost one, so that (C,0,0) is chosen as the lookup of ECI 1 and state 3.

Supporting Variable-Length Columns in Memory

The storage layout shown in FIG. 13 must be mapped to a physical memory, in which the entire table will typically be too large to be fetched in one memory access. Field-Programmable Gate Arrays (FPGAs) and similar devices often support memory banks that can be configured in terms of their size and word-length. Moreover, the size of a given entry depends on the number of bits allocated for each field (run-length, next state identifier, match restart flag, match flag). The analysis below is based on the general assumption that x transition table entries may be retrieved per cycle. In single port memory, this means that x will match the number of transition entries per word. For multi-port memory, this means that x will match the number of ports multiplied by the number of transition entries per word. As an example, a physical memory that supports 5 accesses per cycle and holds 3 entries per word is accommodated in the preferred embodiment by setting x=5×3=15. However, a physical memory that supports only one access per cycle and holds three entries per word is accommodated in the preferred embodiment by setting x=3.

Some architectures offer more flexibility than others with respect to the possible choices for x. For example, the bits of an FPGA Block Ram can sometimes be configured in terms of the number of words and the length of each word. The following considerations generally apply to the best choice for x:

Memory accesses are generally reduced by driving x as high as possible.

The logic in FIG. 14 grows with the number of entries that must be processed at one time. The impact of that growth on the circuit's overall size depends on the target platform and implementation. Significant FPGA resources are required to realize the logic in FIG. 14.

Supporting Variable-Length Columns in Memory: Transition Table Memory

Once x is chosen, the compressed columns will be placed in the physical memory as compactly as possible. FIG. 15(*b*) shows an example where the columns of the transition table are packed into a memory with x=3. Each word in the memory is indexed by a memory address. For example, the word indexed by memory address 0 includes the following transitions 5(B, 1, 0), 3(A, 1, 0), and 1(C, 0, 0). Due to the varying length of each column, a given column may start at any entry within a row.

By introducing a layer of indirection in the transition table, it is possible to leverage the memory efficiency provided by run-length coding and compact deployment of entries in the transition table memory (TTM). FIG. 15(*a*) shows an example of such an Indirection Table which contains one entry for each ECI. Since ECIs may be assigned contiguously, the Indirection Table may be directly addressed using the ECI value for a given input string. Each Indirection Table entry may consist of the following:

pointer: address of the memory word in the Transition Table Memory containing the first entry of the run-length coded transition table column;

transition index: index of the first entry of the run-length coded transition table column in the first memory word for the column;

transition count: (or "count" in shorthand) the number of entries in the run-length coded transition table column;

Once the Indirection Table entry is retrieved using the input symbol ECI, the pointer in the retrieved entry is used to read the first memory word from the TTM. Recall x is the number of entries per memory word in the TTM. An entire column is accessed by starting at address transition index and reading w consecutive words from the TTM, where w is given by:

$$w = \left\lceil \frac{transition.count + transition.index}{x} \right\rceil \quad (1)$$

The transition index and transition count values determine which entries in the first and last memory words participate in the column. In the example in FIG. 15, each TTM word is capable of storing three entries, where an entry is a run-length coded transition tuple. As can be seen in FIG. 15 by virtue of shading, it can be seen that two reads of the Transition Table memory are required to fetch the column for ECI 1. The particular values of transition index and transition count for ECI 1 indicate that the column begins in the second entry of the first word fetched, and continues until the first entry of the last word fetched. If TTM entries were wasted by arranging for each column to start at index 0, then the number of accesses can be reduced to $$\left\lceil \frac{transition.count}{x} \right\rceil.$$

Because 0≦transition index<x, compact storage in the TTM increases the number of accesses by at most 1.

As discussed below and shown in FIG. 25, accesses to the Indirection Table and TTM can be pipelined with each other and with the other components of the design of the present invention. If multi-port memory is available, both tables may be stored in the same physical memory without degrading performance. However, the layer of indirection results in a variable number of accesses to the Transition Table Memory per state transition, depending on the distribution of a run-length coded column's contents in the TTM. For a particular ECI, the number of memory accesses to retrieve the column from memory cannot exceed the number required in the direct-addressed approach. On average, the number of memory accesses per state transition is considerably less. It is believed by the inventors generally that the memory efficiency achieved via run-length coding and indirection more than compensates for the overhead incurred by storing the Indirection Table and the additional run-length field.

Furthermore, the allocation of memory for the Indirection Table is relatively straightforward, as each entry is the same size and the number of entries is equal to the maximum number of input symbol equivalence classes.

Supporting Variable-Length Columns in Memory: State Selection

The implementation of a State Select logic circuit that preferably takes into account the efficient storage layout of the TTM and offers other optimizations is now described. While the TTM offers compact storage of the compressed columns, state selection logic becomes more complex. The logic shown in FIG. 14 assumes that a compressed column can be presented to the logic at once, with no extraneous entries. That logic is suboptimal for performing state selection using the TTM for the following reasons:

A compressed column may span multiple words of the TTM.

The start of a compressed column may begin in the middle of a TTM word. Thus, entries before the start must be suppressed for state selection.

The end of a compressed column may occur before the end of a TTM word. Thus, entries after the end must be suppressed for state selection.

The logic shown in FIG. 14 uses adders to accumulate the sum of all run lengths before each entry. Because the run lengths are fixed inside each entry, the adders can be obviated by precomputing the prefix sums and storing them, instead of the run-lengths themselves, as the "coefficient" in each tuple. By precomputing sums, the tables shown in FIG. 15 are transformed into the tables shown in FIG. 16.

The amount of logic used to determine the beginning and end of the compressed column can also be reduced. The start of each column is specified in the Indirection table using the pointer and transition index fields, which provide the TTM word containing the first entry and the index within that word of the entry. The number of words w occupied by the compressed column is then given by Equation (1). Each fully occupied word contains x entries of the compressed column. In the last word, the largest index occupied by the compressed column is given by:

$$(\text{count}+\text{index}-1) \bmod x \quad (2)$$

Logic could be deployed in the State Select circuit to compute Equation 2. However, x is a design-time parameter. By appropriate parameterization of Hardware Definition Language (HDL) code, Equation 2 can be computed when the Indirection and TTM tables are generated.

Thus, the amount of computational logic can be reduced by storing the following variables for each entry in the Indirection Table:

Pointer: the address of the TTM word containing the first entry in the transition table column Initial Transition Index: the index of the first entry (of the transition table column) in the first TTM word spanned by the transition table column Terminal Transition Index: the index of the last entry (of the transition table column) in the last TTM word spanned by the transition table column

[Additional] Word Count: w−1 where w is computed by Equation 1.

Continuing this example, FIGS. 17(a) and (b) respectively show the Indirection Table and TTM entries for the transition table shown in FIG. 16. Essentially, the transition count values are translated into the word count values and terminal transition index values. This translation does not affect the contents of the TTM, but reduces the logic needed to process these tables.

Figures 18, 19:
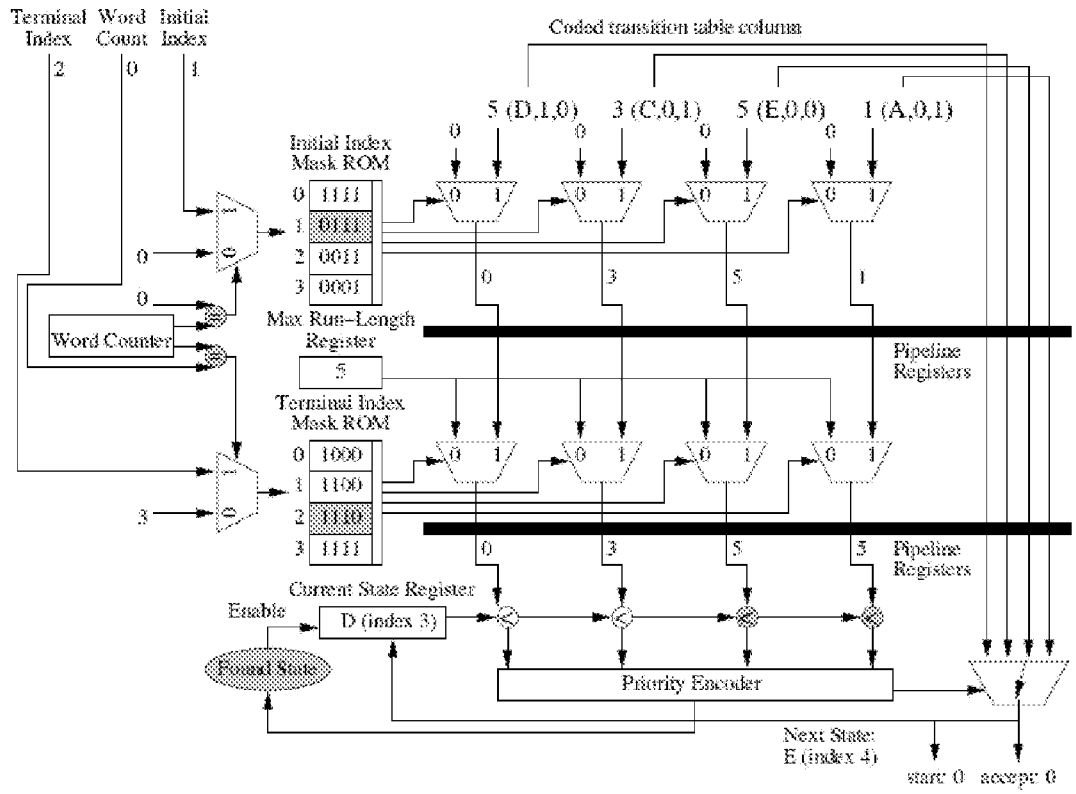
FIG. 18 illustrates an exemplary state selection logic circuit.

The State Select block logic that is shown in FIG. 18 operates on a transition table column containing two entries that spans one TTM word. Each word stores four entries. The output of the Word Counter shown in FIG. 18 reflects the number of memory words that have been examined for the current transition table row. If the current memory word is the first word spanned by the row, then the Initial Transition Index is used to retrieve a set of mask bits from the Initial Transition Index Mask ROM. These bits are used to mask off preceding entries in the memory word that are not part of the transition table column. Masking is accomplished by forcing the run-length sums to be zero. Note that if the current memory word is not the first word spanned by the column, then no entries are masked at this stage.

The next stage "masks" the entries in the last memory word that are not part of the transition table column. The run-length sums for entries that are not part of the transition table column are forced to the value of the Max Run-Length Register. This value records the maximum number of entries in a transition table column (i.e. the number of columns in the uncoded transition table; also the value of the run-length sum for the last entry in each coded transition table column). If the current memory word is the last memory word spanned by the transition table column (value of the Word Counter is equal to Word Count), then the Terminal Transition Index is used as the address to the Terminal Transition Index Mask ROM. If this is not the case, then no entries are masked during this stage. Forcing the run-length sums of trailing entries to be the maximum run-length sum value simplifies the Priority Encoder that generates the select bits for the multiplexer that selects the next state. This masking process produces an output vector from the less-than comparisons with the following property: the index of the left-most '1' bit is the index of the next state entry, and all bits to right of this bit will be set to '1'. As previously referenced, it should be noted that the masking stages may be pipelined to increase throughput. In an alternative embodiment, only the less than comparisons, priority encoder, and next state selection logic need to occur in the final pipeline stage.

Optimizations

Achieving a high-throughput regular expression pattern-matching engine is the primary motivation for developing the high-throughput DFA, character encoding, and transition table compression techniques that are disclosed herein. In the following, techniques that optimize the throughput of the system at the expense of some memory efficiency are examined; thus, each of the following techniques is constrained by the TTM. Specifically, the TTM imposes the following constraints:

The number of entries per word
The number of memory words in the table
The total number of entries in the table The optimization problems discussed in this section fall into the class of bin packing or knapsack problems. See Cormen et al., *Introduction to Algorithms*, Cambridge, Mass., The MIT Press, 1990, the entire disclosure of which is incorporated herein by reference. The number of entries per word defines the bin (or knapsack) size for the packing problems. The structure of the coded transition table may be altered to minimize the number of memory accesses by increasing the total number of entries and/or words required to represent the table so long as the total number entries or total number of words (bins or knapsacks) does not exceed the limits imposed by the Transition Table Memory.

Optimizations: Optimizing Throughput

The number of memory accesses required for a search is determined by the disposition of compressed columns in the TTM and the pattern by which those columns are accessed. The pattern depends on the set of regular expressions in the engine and the particular input data processed through the engine. In a $DFA^m$, m input symbols are resolved to an ECI which induces one column lookup. The number of memory accesses depends on the length of the columns in the coded transition table and the column access pattern. The column access pattern depends on the regular expression (or set of regular expressions) in the engine and the input data. The total number of memory accesses for a given search can be expressed as:

$$W = N \sum_{i=1}^{|K|} f_i w_i \qquad (3)$$

where $w_i$ is the number of words spanned by row i in Transition Table Memory, $f_i$ is the relative frequency that row i is accessed, and N is the number of equivalence class identifiers produced by the input data.

While there is no prior knowledge of the input data, there is an ability to alter the structure of the coded transition table. By re-ordering the rows in the direct-addressed transition table, one can affect the length of the columns in the coded transition table. The optimization problem is to choose the column ordering that minimizes the total number of memory accesses, W. Assume that the transition table column access pattern follows a uniform distribution, $f_i = N/|K|$. In this case:

$$W = \frac{N^2}{|K|} \sum_{i=1}^{|K|} w_i \qquad (4)$$

Under these conditions, the optimization problem is to minimize the quantity:

$$v = \sum_{i=1}^{|K|} w_i = \sum_{i=1}^{|K|} \left\lceil \frac{count_i}{x} \right\rceil \qquad (5)$$

Recall that $count_i$, is the transition $count_i$, or the number of entries in row i of the run-length coded transition table and x is the number of entries per word in the TTM.

To simplify the optimization problem, one can assume that x=1, so the quantity that now needs to be minimized is:

$$v = \sum_{i=1}^{|K|} count_i \qquad (6)$$

This will generally yield similar results to minimizing the function with an arbitrary x.

FIG. 19 illustrates the benefits of state reordering for the running example presented herein.

There are many approaches to state reordering. One approach is to minimize the length of a single column of the coded transition table by ordering the rows of the direct-addressed table according to the sorted order of the entries in the row. This maximizes the efficiency of the run-length coding for that one column. However, the re-ordering may also decrease the efficiency of the run-length coding for other columns.

The preferred approach is a greedy one; preferably it is desired to maximize the length of the runs for the most columns, thereby minimizing the length of each encoded column.

One can start by creating a difference matrix, which given two states indicates the number of ECIs that differ, and so will not continue a run. This algorithm is shown in FIG. 20.

Next, one then orders the states from some starting point based on the entries in the difference matrix. One preferably chooses the states that preserves the most run lengths to get the next label. The starting state that is chosen is preferably the state that has the largest column-sum in the difference matrix. The idea for picking that state first is that it is the state that is the most different from all others. By moving that state to the end (rather than in the middle), one preserves the longest runs. This algorithm is outlined in FIG. 21. Together the algorithms of FIGS. 20 and 21 serve as a "transition table state re-ordering" algorithm Optimizations: Memory Packing Recall that the layer of indirection allows a column of the coded transition table to begin and end at any location in the TTM. Naïve packing of coded table columns into physical memory can thwart the aforementioned optimizations by incurring an extra memory access for each table column. Notice in FIG. 15 that the run-length coded transition table column associated with input symbol (ECI 1) contains three entries, but it spans two memory words in the TTM. While it is possible to store the column in a single memory word, accessing this column requires two memory accesses as laid out in FIG. 15. One can take advantage of the flexibility provided by the layer of indirection by ensuring that a coded transition table row spans at most w words, where:

$$w \leq \left\lceil \frac{count}{x} \right\rceil \qquad (7)$$

FIG. 20 shows an example of using this constraint to pack the coded transition table into the TTM. It can be seen that retrieving the column associated with ECI 1 requires only one memory access. In this example, there is no loss in memory efficiency; however this may not always be the case. For example, consider the case where a memory word holds three entries and every coded transition table column contains two entries.

This memory packing problem is a variant of the classical fractional knapsack problem where w is the constraint or objective function. See Black, P. E., *Dictionary of Algorithms and Data Structures*, NIST, 2004, the entire disclosure of which is incorporated herein by reference. The difference in the preferred embodiment here is that we require contiguous storage of coded transition table columns. This imposes an additional constraint when partitioning an object (coded transition table column) across multiple knapsacks (memory words) in the classical problem.

One solution to this problem is based on subset sum. While this is an NP-complete problem in the general case (see Garey and Johnson, *Computers and Intractability: A Guide to the Theory of NP-Completeness*, W. H. Freeman and Co., 1979, the entire disclosure of which is incorporated herein by reference), there are certain conditions in which it runs in polynomial time, namely if the sum is much less than the number of elements that are to be chosen from to create the sum. The sum of the preferred embodiment will always be the width of a memory word, so the preferred algorithm will also run in polynomial time.

The basic idea is to find the longest run-length coded column and choose it first. One then will pack it into memory words guaranteeing that it achieves the best possible packing. One can then take the number of remaining entries in the last column and apply subset sum on it with the remaining run-length coded columns. This will pack the memory as full as possible without causing additional memory accesses. This process is repeated until no encoded columns remain. This algorithm is outlined in FIG. 21, referred to herein as an "optimal memory word packing" algorithm, where R is the set of run-length coded columns, and w is the width of a memory word.

An Implementation Architecture

In this section, an implementation of a high-performance regular expression search system based on the preferred high-throughput DFA and pipelined transition table techniques is described. The focus of this implementation is a hybrid processing platform that includes multiple superscalar microprocessors and reconfigurable hardware devices with high-bandwidth interconnect to an array of high-speed disks. FIG. 24 shows an example of the system-level architecture and includes a user interface, regular expression compiler, file I/O controller, regular expression firmware module, and results processor.

The purpose of the architecture is to maximize throughput by embedding an array of regular expression engines in the reconfigurable hardware devices (e.g., FPGAs). The array of engines, supporting control logic, and context buffer(s) may be logically viewed as a single firmware module. In an embodiment wherein the regular expression circuits/engines are realized on an FPGA, these engines can be synthesized to a hardware definition language (HDL) representation and loaded onto the FPGA using known techniques.

Each regular expression engine's primary task is to recognize regular expressions in the input files streaming off of the high-speed disks. The set of regular expressions is preferably specified by the user through the user interface, compiled into high-throughput DFAs, and translated into a set of tables and register values by a collection of software components. The set of tables and register values are written to the firmware module prior to beginning a search. When a regular expression engine recognizes a pattern, it sends a message to the Results Processor that includes the context (portion of the file containing the pattern), starting and ending indexes of the pattern in the file, and the accepting state label. Depending on the operating environment and level of integration, the user interface may be a simple command line interface, Graphical User Interface (GUI), or language-specific API. The following subsections provide detailed descriptions of the remaining components.

An Implementation Architecture: Regular Expression Compiler

As detailed in FIG. 5, the regular expression compiler receives the set of regular expressions specified by the user from the user interface. Thereafter, standard algorithms from the art are used to parse the specified regular expression(s) to create an NFA therefrom, render the NFA to a position independent DFA, and reduce the position independent DFA to a minimal DFA. The next step performed by the regular expression compiler is to transform the conventional minimal DFA to the preferred high throughput DFA of the present invention. This step comprises the processes described above with respect to scaling the DFA to accommodate strides of m input symbols per cycle (including the determination of appropriate match and match restart flags for the transition table and the encoding of input symbols to ECIs), and run-length coding the transition table. Next, the algorithms of FIGS. 20 and 21 can be run to optimize the storage of the run-length coded transitions in transition table memory and the algorithm of FIG. 23 can be run to optimize the packing of the run-length coded transition entries into words of the transition table memory. Thereafter, the entries in the indirection table can be determined, and the compiler is ready to issue commands to the regular expression circuit 502 that will operate to populate the circuit's memory for the input symbol-to-ECI tables, the indirection memory table and transition table.

An Implementation Architecture: Results Processor

It is expected that any of a variety of techniques can be used to report the results of a search via a results processor. The preferred results processor can be configured to resolve the exact expression and input string segment for each match using the results produced by the regular expression circuits (engines). In a preferred embodiment such as that shown in FIG. 24, the results produced by a regular expression circuit (engine) include a unique engine identifier (ID), the start state, the accepting state, and the ECI for m input symbols that triggered the accepting transition. The results may also include the context for the match, which is a section of the input stream containing a string that matches the pattern. The results processor reports the matching string and associated regular expression (pattern) to the user interface.

An Implementation Architecture: File I/O Controller

The file I/O controller is a component of the system that controls the input stream. In the exemplary system of FIG. 24, the file I/O controller controls the stream of files flowing from a data store to the regular expression circuits. Note that the input stream may also be fed by a network interface (or other data interface) as is known in the art.

An Implementation Architecture: Regular Expression Firmware

The regular expression firmware module is the primary datapath component in the system architecture shown in FIG. 24. It preferably contains an array of regular expression engines (or pattern matching circuits) and a small amount of control logic. The number of engines in the array depends on the capacity of the reconfigurable hardware devices in the system. The control logic broadcasts the input file stream to each regular expression engine, thus the engines operate in parallel on the same input data. The control logic also sends a copy of the input to a context buffer. The size of the context buffer depends on the amount of context that is to be sent to the Results Processor when an engine recognizes a pattern. This parameter may be tuned to maximize the amount of context that may be returned while not overloading the firmware/software interface.

As previously mentioned, the throughput of a regular expression engine is fundamentally limited by the rate at which it can compute state transitions for the deterministic finite automaton. Resolving the next state based on the current state and input symbol is an inherently serial operation. In order to take advantage of the reconfigurable logic resources available on the preferred implementation platform, it is desired to maximize parallelism. Pipelining is a common technique for increasing the number of parallel operations in serial computations; however, it requires that the processing pipeline be free of feedback loops. The outputs of operations at a given stage of the pipeline cannot depend upon the results of a stage later in the pipeline. As shown in FIG. 25, the regular expression engine is a series of pipelined computational blocks. Note that there are no feedback loops between the blocks; each block operates on the results of the previous block only. This is a distinguishing feature of the preferred embodiment of the present invention. Alphabet encoding is a state-independent operation that only operates on the set of input symbols. Indirection table lookups use the resulting input symbol ECI to locate an entry. Transition table lookups depend only on the pointer and indexes contained in the Indirection Table entry. The only operation that depends on the current state is the last computation in the State Select block. By effectively "pushing" this singular feedback loop to the final stage of the pipeline, the preferred embodiment maximizes parallelism and hence the throughput of the regular expression engine. The following sub-sections describe the design of each block in the regular expression engine.

Regular Expression Firmware: Alphabet Encoding

Figure 26:
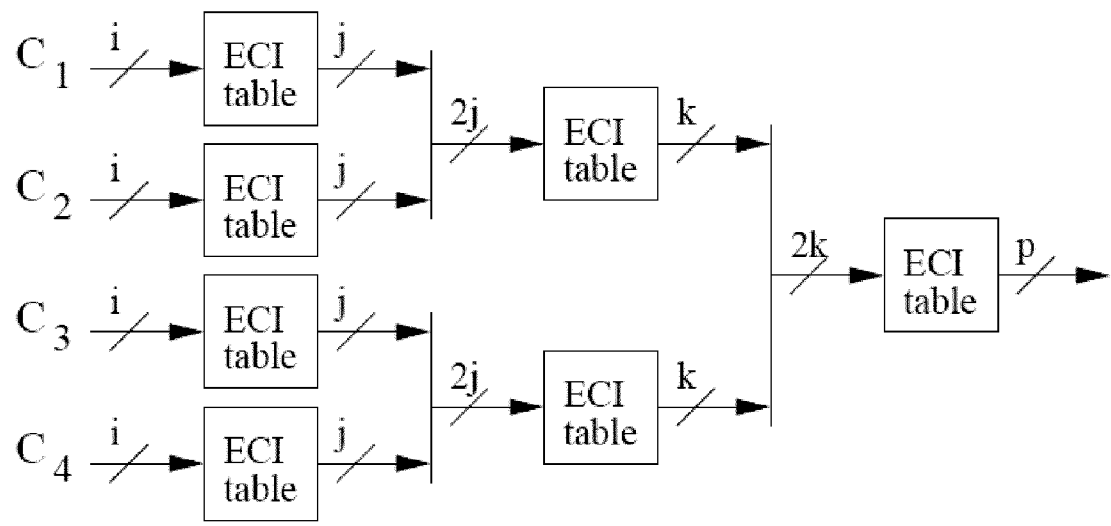
FIG. 26 depicts a preferred process for assigning ECIs to input symbols using direct-address tables and pairwise combination.

The Alphabet Encoding block assigns an Equivalence Class Identifier (ECI) for a set of m input symbols. If each input symbol is specified using i bits and an ECI is specified using p bits, then the Alphabet Encoding block essentially reduces the input from mi bits to p bits. A straightforward method for performing this operation is to perform pairwise combinations using direct-addressed tables. As shown in FIG. 26, the first set of tables transforms one i bit input symbol to a j bit ECI. This step maps single input symbols to equivalence classes. The next stage of tables generates a k bit ECI for two input symbols by simply concatenating two j bit ECIs for single symbols and direct-addressing an ECI table. Note that j is upper bounded by the addressability of the memory used to implement the ECI tables in the second stage. Specifically, 2j must be less than or equal to the number of address bits supported by the memory. Similarly, the next stage generates a p bit ECI for four input symbols by concatenating two k bit ECIs for two symbols and direct-addressing an ECI table. Likewise, the address space supported by the ECI table places an upper bound on k. In theory, this technique may be used to assign an ECI to any number of input symbols; but in practice, the memory efficiency significantly degrades as the number of symbols covered by the final equivalence class increases.

Figure 25:
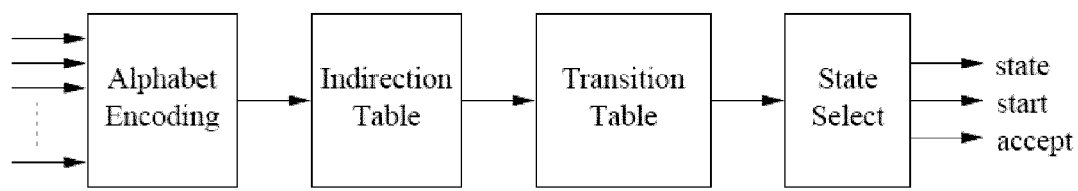
FIG. 25 depicts the regular expression engine of the preferred embodiment as a series of pipelined computational blocks.

The logic required to implement subsequent stages of the FIG. 25 pipeline have already been discussed above.

Regular Expression Firmware: Buffers

Each regular expression engine preferably includes small input and output buffers. The input buffers prevent a single engine from stalling every engine in the array when it must retrieve a transition table column that spans multiple words in the TTM. While the entire array must stall when any engine's input buffer fills, the input buffers help isolate the instantaneous fluctuations in file input rates. The output buffers allow the regular expression engines to continue processing after it has found a match and prior to the match being transmitted to the Results Processor. The Context Buffer preferably services the output buffers of the regular expression engines in round-robin fashion. If the output buffer of any engine fills, then the engine must stall prior to sending another result to the output buffer. The array preferably must stall if the engine's input buffer fills.

While the present invention has been described above in relation to its preferred embodiment, various modifications may be made thereto that still fall within the invention's scope. Such modifications to the invention will be recognizable upon review of the teachings herein. For example, while the transition tables have been described herein such that the rows correspond to states and the columns correspond to ECIs, it should be readily understood that the rows and columns of any of the tables described herein can be reversed. As such, the full scope of the present invention is to be defined solely by the appended claims and their legal equivalents.

What is claimed is:

1. In a device for matching an input string to a pattern via a deterministic finite automaton (DFA), the DFA comprising a plurality of states including a current state and a plurality of possible next states, the input string comprising a plurality of input symbols, the improvement comprising:
the device comprising at least two parallel pipeline stages;
a first one of the pipeline stages being configured to retrieve a plurality of transitions to a possible next state of the DFA from a pre-populated memory; and
a second one of the pipeline stages that is configured to choose, based at least in part upon the DFA's current state, one of said retrieved transitions from which the integrated circuit will determine the next state of the DFA, wherein the second one of the pipeline stages is downstream from the first one of the pipeline stages.

2. The device of claim 1 wherein the improvement further comprises the first one of the pipeline stages being configured to retrieve a plurality of transitions to a possible next state of the DFA from a pre-populated memory without consideration of the current state of the DFA.

3. The device of claim 2 wherein the improvement further comprises the second one of the pipeline stages being the final downstream pipeline stage of the device.

4. A method for matching an input string to a pattern in a device that realizes a deterministic finite automaton (DFA), the DFA comprising a plurality of states including a current state and a plurality of possible next states, the input string comprising a plurality of input symbols, the device comprising at least two parallel pipeline stages, the method comprising:
within one of the pipeline stages, retrieving from a memory a plurality of stored transitions to a next possible state of the DFA; and
within another of the pipeline stages that is downstream in the pipeline from the pipeline stage from which the plurality of transitions were retrieved, selecting one of the retrieved transitions to identify the next state of the DFA, wherein the selecting is based at least in part upon the current state of the DFA.

5. The method of claim 4 wherein the retrieving step is performed without consideration of the current state of the DFA.

6. A device comprising:
a multi-stage pattern matching pipeline configured to receive an input data stream comprising a plurality of input symbols and process the received data stream, wherein the pipeline realizes a pattern matching deterministic finite automaton (DFA) that is configured to determine whether any string of input symbols within the data stream matches a pattern, the DFA having a plurality of states including a current state, the pipeline comprising a plurality of stages including a final stage, each stage having at least one stage input and at least one stage output, the final stage being configured to provide as outputs a next state for the DFA, wherein the only stage of the pipeline that receives a feedback loop based on a stage output is the final stage.

7. The device of claim 6 wherein the final stage is configured to receive the next state in the feedback loop such that the next state is used as the current state when processing a next input symbol of the input data stream.

8. The device of claim 7 wherein the pipeline is further configured with a plurality of the multi-stage pattern matching pipelines for processing the input data stream in parallel.

9. The device of claim 7 wherein the pipeline comprises an FPGA.

10. The device of claim 7 wherein the pipeline comprises an ASIC.

11. The device of claim 7 wherein the pipeline comprises a processing system, the processing system comprising a plurality of different processors that are arranged in a pipeline, each processor being configured to implement at least one of the pipeline stages.

12. A device comprising:
a data processing pipeline configured to receive an input data stream comprising a plurality of input symbols and process the received data stream through a logic circuit to determine whether any input symbol string within the input data stream matches a pattern, the logic circuit being configured to realize a deterministic finite automaton (DFA), the DFA comprising a plurality of states, an alphabet of input symbols, an alphabet of equivalence class identifiers (ECIs), a set of functions that map groups of m input symbols to corresponding ECIs, and a set of functions that define transitions between states of the DFA, each state transition function being indexed by an ECI and comprising a next state identifier and a match flag, wherein m is an integer that is greater than or equal to one.

13. The device of claim 12 wherein the DFA further comprises a set of functions that map each ECI to at least one state transition function.

14. The device of claim 13 wherein each state transition function further comprises a match restart flag.

15. The device of claim 14 wherein the DFA further comprises a variable that tracks the starting input symbol of each potential pattern match.

16. The device of claim 15 wherein the DFA further comprises a variable that tracks the final input symbol of an actual pattern match.

* * * * *